US011374328B2

(12) United States Patent
Takano et al.

(10) Patent No.: US 11,374,328 B2
(45) Date of Patent: Jun. 28, 2022

(54) ANTENNA DEVICE FOR VEHICLE

(71) Applicant: YOKOWO CO., LTD., Tokyo (JP)

(72) Inventors: Masayuki Takano, Tomioka (JP); Yoshinori Takahashi, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 0 days.

(21) Appl. No.: 16/963,507

(22) PCT Filed: Feb. 15, 2019

(86) PCT No.: PCT/JP2019/005532
§ 371 (c)(1),
(2) Date: Jul. 21, 2020

(87) PCT Pub. No.: WO2019/160078
PCT Pub. Date: Aug. 22, 2019

(65) Prior Publication Data
US 2021/0050647 A1    Feb. 18, 2021

(30) Foreign Application Priority Data

Feb. 19, 2018  (JP) .............................. JP2018-026935

(51) Int. Cl.
*H01Q 1/20* (2006.01)
*H01Q 9/36* (2006.01)
(Continued)

(52) U.S. Cl.
CPC ................. *H01Q 9/36* (2013.01); *H01Q 1/20* (2013.01); *H01Q 1/3275* (2013.01); *H01Q 1/42* (2013.01)

(58) Field of Classification Search
CPC ............................... H01Q 9/36; H01Q 1/3275
See application file for complete search history.

(56) References Cited

U.S. PATENT DOCUMENTS 9,225,055 B2 *  12/2015  Kaneko .................... H01Q 1/24
9,627,745 B2 *  4/2017  Hayashi .................. H01Q 1/42
(Continued)

FOREIGN PATENT DOCUMENTS

| EP | 3171454 A1 | 5/2017 |
| JP | 5918844 B2 | 5/2016 |
| WO | 2017/141635 A1 | 8/2017 |

OTHER PUBLICATIONS

US 11,121,457 B2, 09/2021, Terashita (withdrawn)*
(Continued)

*Primary Examiner* — Ab Salam Alkassim, Jr.
(74) *Attorney, Agent, or Firm* — Xsensus LLP

(57) ABSTRACT

Provided is an antenna device for a vehicle capable of firmly fixing a capacitance loading element. An antenna device 1 for a vehicle includes: an antenna case 5; a capacitance loading element 20 housed in an internal space of the antenna case 5; a capacitance loading element holder 10 including an upper holder 11 and a lower holder 12 and configured to sandwich and hold the capacitance loading element 20 between the upper holder 11 and the lower holder 12; and a metal base 50 configured to hold the lower holder 12. The capacitance loading element 20 includes two elements and a connecting portion that connects the two elements, the connecting portion is provided at a position lower than upper edges of the two elements, the upper holder 11 holds the two elements, and the upper holder 11 and the lower holder 12 sandwich and hold the connecting portion.

17 Claims, 25 Drawing Sheets

(51) Int. Cl.
   *H01Q 1/32* (2006.01)
   *H01Q 1/42* (2006.01)

(56) References Cited

U.S. PATENT DOCUMENTS

| | | | | |
|---|---|---|---|---|
| 10,276,927 B2* | 4/2019 | Ohno | H01Q 1/3275 |
| 10,355,335 B2* | 7/2019 | Ohno | H01Q 21/28 |
| 10,978,794 B2* | 4/2021 | Terashita | H01Q 9/36 |
| 11,121,471 B2* | 9/2021 | Forslund | H01Q 21/24 |
| 11,152,692 B2* | 10/2021 | Terashita | H01Q 21/30 |
| 2002/0171593 A1* | 11/2002 | Wakui | H01Q 1/42 343/713 |
| 2008/0117111 A1* | 5/2008 | Ikeda | H01Q 5/371 343/713 |
| 2009/0207084 A1* | 8/2009 | Ikeda | H01Q 5/40 343/713 |
| 2010/0265147 A1* | 10/2010 | Wakui | H01Q 1/36 343/725 |
| 2012/0188143 A1* | 7/2012 | Yang | H01Q 1/42 343/872 |
| 2012/0326935 A1* | 12/2012 | Kang | H01Q 11/08 343/713 |
| 2013/0229315 A1* | 9/2013 | Duzdar | H01Q 1/32 343/713 |
| 2013/0342405 A1* | 12/2013 | Ueno | H01Q 1/32 343/713 |
| 2014/0125531 A1* | 5/2014 | Kaneko | H01Q 1/3275 343/713 |
| 2014/0159964 A1* | 6/2014 | Kaneko | H01Q 1/32 343/702 |
| 2014/0176374 A1* | 6/2014 | Lo | H01Q 1/3275 343/713 |
| 2015/0349409 A1* | 12/2015 | Imamura | H01Q 9/36 343/713 |
| 2016/0064807 A1* | 3/2016 | Reed | H01Q 1/38 343/713 |
| 2016/0315378 A1* | 10/2016 | Kiriyama | H01Q 9/36 |
| 2017/0062914 A1* | 3/2017 | Masaka | H01Q 1/1214 |
| 2017/0179584 A1* | 6/2017 | Nakada | H01Q 1/3275 |
| 2017/0207520 A1* | 7/2017 | Ohno | H01Q 7/00 |
| 2017/0214112 A1* | 7/2017 | Ohno | H01Q 1/1214 |
| 2017/0214129 A1* | 7/2017 | Ohno | H01Q 1/52 |
| 2018/0212301 A1* | 7/2018 | Iino | H01Q 1/12 |
| 2018/0261913 A1* | 9/2018 | Imamura | H01Q 1/3275 |
| 2019/0006733 A1* | 1/2019 | Yasin | H01Q 1/36 |
| 2019/0027819 A1 | 1/2019 | Terashita et al. | |
| 2019/0036198 A1* | 1/2019 | Mizuno | H01Q 23/00 |
| 2019/0280372 A1* | 9/2019 | Terashita | H01Q 5/371 |
| 2019/0379109 A1* | 12/2019 | Terashita | H01Q 1/42 |
| 2020/0028249 A1* | 1/2020 | Terashita | H01Q 1/521 |
| 2020/0067180 A1* | 2/2020 | Mizuno | H01Q 9/0407 |
| 2020/0067181 A1* | 2/2020 | Tanaka | H01Q 9/40 |
| 2020/0091615 A1* | 3/2020 | Sone | H01Q 19/10 |
| 2020/0168982 A1* | 5/2020 | Asuma | H01Q 1/3275 |
| 2021/0044006 A1* | 2/2021 | Shimizu | H01Q 1/3275 |
| 2021/0135363 A1* | 5/2021 | Sone | H01Q 13/08 |
| 2021/0242584 A1* | 8/2021 | Terashita | H01Q 9/36 |
| 2021/0273320 A1* | 9/2021 | Yokota | H01Q 1/325 |

OTHER PUBLICATIONS

International Search Report and Written Opinion dated Mar. 19, 2019 for PCT/JP2019/005532 filed on Feb. 15, 2019, 8 pages including English Translation of the International Search Report.
Extended European search report dated Oct. 19, 2021, in corresponding European patent Application No. 19753819.2, 8 pages.

* cited by examiner

ANTENNA DEVICE FOR VEHICLE

CROSS-REFERENCE TO RELATED APPLICATIONS

The present application is based on PCT filing PCT/JP2019/005532, filed Feb. 15, 2019, which claims priority to JP 2018-026935, filed Feb. 19, 2018, the entire contents of each are incorporated herein by reference.

TECHNICAL FIELD

The present invention relates to an antenna device for a vehicle.

BACKGROUND ART

Conventionally, there is a proposed antenna for a vehicle including a capacitance loading element and a helical element as disclosed in Patent Literature 1.

The capacitance loading element is held by a capacitance loading element holder by putting the capacitance loading element over the capacitance loading element holder erected on a base.

CITATION LIST

Patent Literature

Patent Literature 1: JP 5918844 B2

SUMMARY OF INVENTION

Technical Problem

However, a capacitance loading element is not firmly fixed to a capacitance loading element holder.

Therefore, the present invention is directed to providing an antenna device for a vehicle capable of firmly fixing the capacitance loading element.

Solution to Problem

An antenna device for a vehicle according to the present invention includes: an antenna case; a capacitance loading element housed in an internal space of the antenna case; a capacitance loading element holder including an upper holder and a lower holder and adapted to sandwich and hold the capacitance loading element between the upper holder and the lower holder; and a base that holds the lower holder.

The upper holder and the lower holder sandwich and hold the capacitance loading element. Therefore, compared to a configuration in which the capacitance loading element is sandwiched and held in a right-left direction, the capacitance loading element is more hardly displaced in a vertical direction by vehicle vibration. Accordingly, the capacitance loading element is firmly fixed, and it is possible to make the capacitance loading element hardly come off the capacitance loading element holder.

Preferably, the capacitance loading element includes two elements and a connecting portion that connects the two elements. The connecting portion is provided at a position lower than upper edges of the two elements. The upper holder holds the two elements. The upper holder and the lower holder sandwich and hold the connecting portion.

Compared to a configuration in which the connecting portion is fixed to an upper portion of the capacitance loading element holder by screwing, the capacitance loading element can be more firmly fixed to the capacitance loading element holder in a state where the capacitance loading element holder hardly comes off. As a result, it is possible to prevent said fixed state from being released and the capacitance loading element from contacting the antenna case and generating abnormal noise.

Additionally, a fixed position of the capacitance loading element with respect to the capacitance loading element holder can be made constant (an individual difference can be reduced). As a result, electric performance of the capacitance loading element can be prevented from becoming unstable (having larger individual differences) due to variability in production of the antenna devices for the vehicle.

Furthermore, it is possible to suppress displacement of the fixed position of the capacitance loading element, with respect to the capacitance loading element holder, from an appropriate fixed position by vehicle vibration. Moreover, it is possible to suppress deterioration in the electric performance of the capacitance loading element caused by such displacement.

Additionally, the connecting portion is provided at a position lower than the upper edges of the two elements. Therefore, compared to a configuration in which the connecting portion is provided at the upper edges of the two elements, the position where the connecting portion is sandwiched between the upper holder and the lower holder can be further lowered, and this can contribute to height reduction of the antenna device for the vehicle.

More preferably, the upper holder fills a space surrounded by the two elements and the connecting portion.

Most parts of the two elements contact the upper holder. Therefore, compared to a configuration in which these elements do not contact the upper holder, an amplitude of vibration caused by vehicle vibration is smaller in the capacitance loading element, particularly, at a portion not contacting the upper holder, such as the upper edges of the two elements. As a result, it is possible to prevent the capacitance loading element from contacting the antenna case and generating abnormal noise.

More preferably, in a state before the capacitance loading element is attached to the capacitance loading element holder, a first angle formed by a region from a lower edge to an upper edge in each of the two elements with respect to the base is smaller than a second angle formed by a region from a lower edge to an upper edge of a region included in each of side surfaces of the upper holder that holds the two elements, with respect to the base.

When the capacitance loading element is attached to the upper holder, reaction force is applied by the upper holder such that upper portions of the two elements separate from each other outward in the right-left direction. Then, this reaction force biases the two elements so as to come close to each other inward in the right-left direction. With this biasing, the capacitance loading element is brought into a state of firmly contacting the upper holder.

Therefore, it is possible to prevent an upper edge of the capacitance loading element from being opened by vehicle vibration, and the capacitance loading element from contacting the antenna case or the like, and generating abnormal noise.

Furthermore, the fixed position of the capacitance loading element with respect to the capacitance loading element holder is hardly displaced from the appropriate fixed position by vehicle vibration. As a result, it is possible to suppress deterioration in the electric performance of the capacitance loading element caused by said displacement.

Additionally, preferably, the upper holder and the capacitance loading element each have a shape in which a width in the right-left direction is gradually narrowed toward rear from front. A width in the right-left direction of the capacitance loading element at the front is wider than a width in the right-left direction of the upper holder at the rear.

Therefore, the capacitance loading element can be easily attached to the upper holder by inserting the front of the capacitance loading element from the rear of the upper holder.

Furthermore, preferably, the upper holder and the capacitance loading element each have a shape in which the width in the right-left direction is gradually narrowed toward front from rear. A width in the right-left direction of the capacitance loading element at the rear is wider than a width in the right-left direction of the upper holder at the front Therefore, the capacitance loading element can be easily attached to the upper holder by inserting the rear of the capacitance loading element from the front of the upper holder.

Furthermore, preferably, the capacitance loading element has a structure divided into a front portion and a rear portion. The upper holder has a shape in which a width in the right-left direction is gradually narrowed toward front from a center portion and a width in the right-left direction is gradually narrowed toward rear from the center portion. The front portion of the capacitance loading element has a shape in which a width in the right-left direction is gradually narrowed toward front from a center portion. The rear portion of the capacitance loading element has a shape in which a width in the right-left direction is gradually narrowed toward rear from the center portion. The width in the right-left direction of the front portion of the capacitance loading element at the rear is wider than the width in the right-left direction of the upper holder at the front. The width in the right-left direction of the rear portion of the capacitance loading element at the front is wider than the width in the right-left direction of the upper holder at the rear.

The capacitance loading element can be easily attached to the upper holder by inserting the front portion of the capacitance loading element from the front of the upper holder and inserting the rear portion of the capacitance loading element from the rear of the upper holder.

More preferably, the capacitance loading element is at least partly formed in a meander shape. The upper holder includes a slit overlapping with the meander shape. The lower holder includes, at a position facing the slit, a rib that can be housed in the slit.

When the rib is fitted into the slit, the rib is fitted into the slit that constitutes the meander shape of the capacitance loading element and that extends upward from a lower end portion.

Compared to a configuration in which the upper holder is not provided with any slit and the lower holder is not provided with any rib, the capacitance loading element can be further prevented from being vibrated in a front-rear direction by vehicle vibration, and the capacitance loading element can be further prevented from contacting the antenna case and generating the abnormal noise.

Additionally, by making the capacitance loading element hardly moved in the front-rear direction, the fixed position of the capacitance loading element with respect to the capacitance loading element holder can be made constant (the individual difference can be reduced), and electric performance of the capacitance loading element can be prevented from becoming unstable (having larger individual differences) due to variability in production of antenna devices for vehicles.

Furthermore, it is possible to suppress displacement of the fixed position of the capacitance loading element, with respect to the capacitance loading element holder, from the appropriate fixed position by vehicle vibration. Moreover, it is possible to suppress deterioration in the electric performance of the capacitance loading element caused by said displacement.

Advantageous Effects of Invention

As described above, according to the present invention, it is possible to provide the antenna device for the vehicle capable of firmly fixing the capacitance loading element.

DESCRIPTION OF EMBODIMENTS

Hereinafter, an antenna device for a vehicle according to the present embodiment will be described with reference to the drawings. Note that the embodiment is not limited to the following embodiments. Additionally, matters described in one embodiment are similarly applied to other embodiments in principle. Furthermore, the respective embodiments and respective modified examples can be combined as appropriate.

First Embodiment

Figure 1:
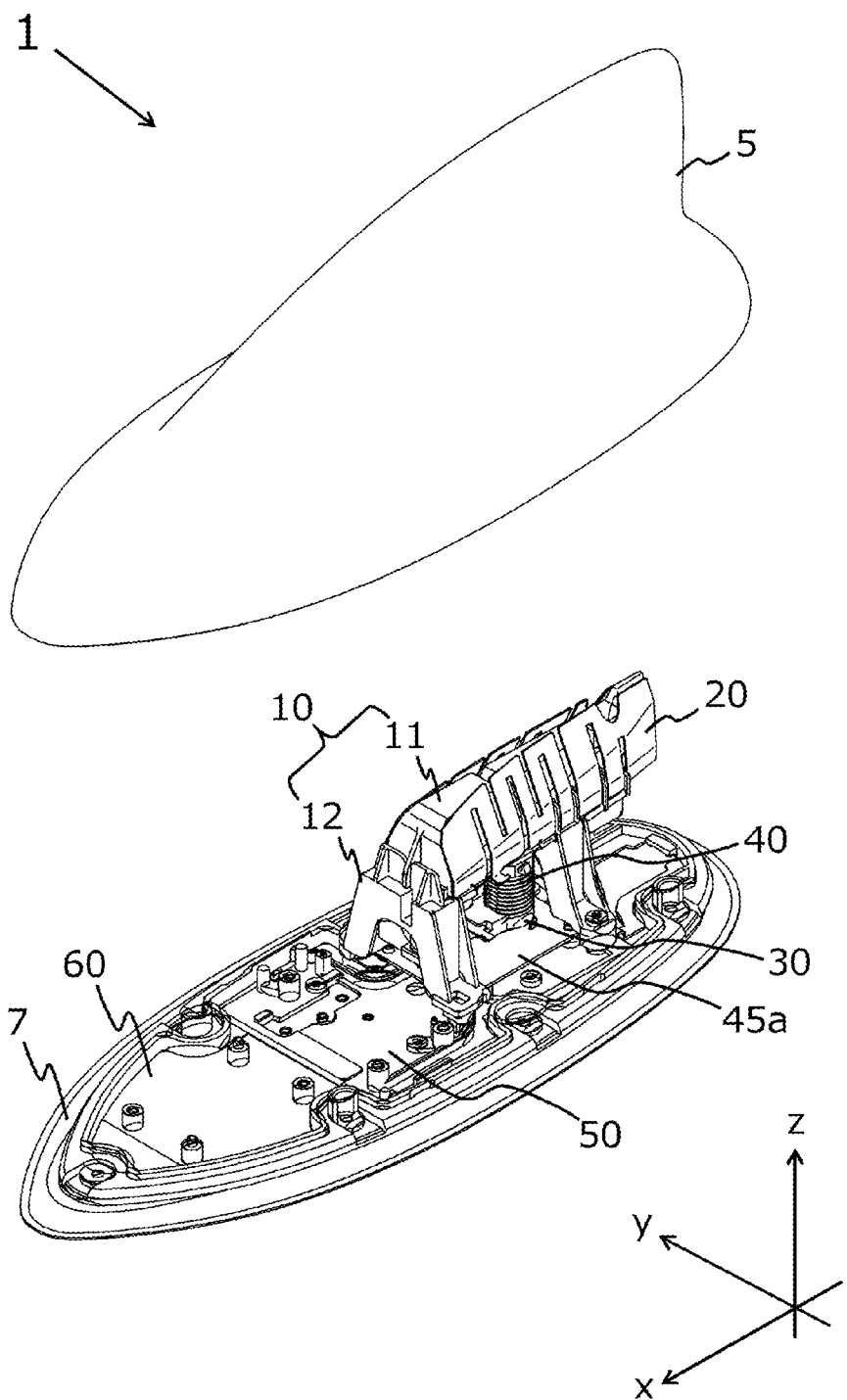
FIG. 1 is a perspective view of an antenna device for a vehicle of a first embodiment when seen from above and illustrates a state before an antenna case is attached.
Figure 2:
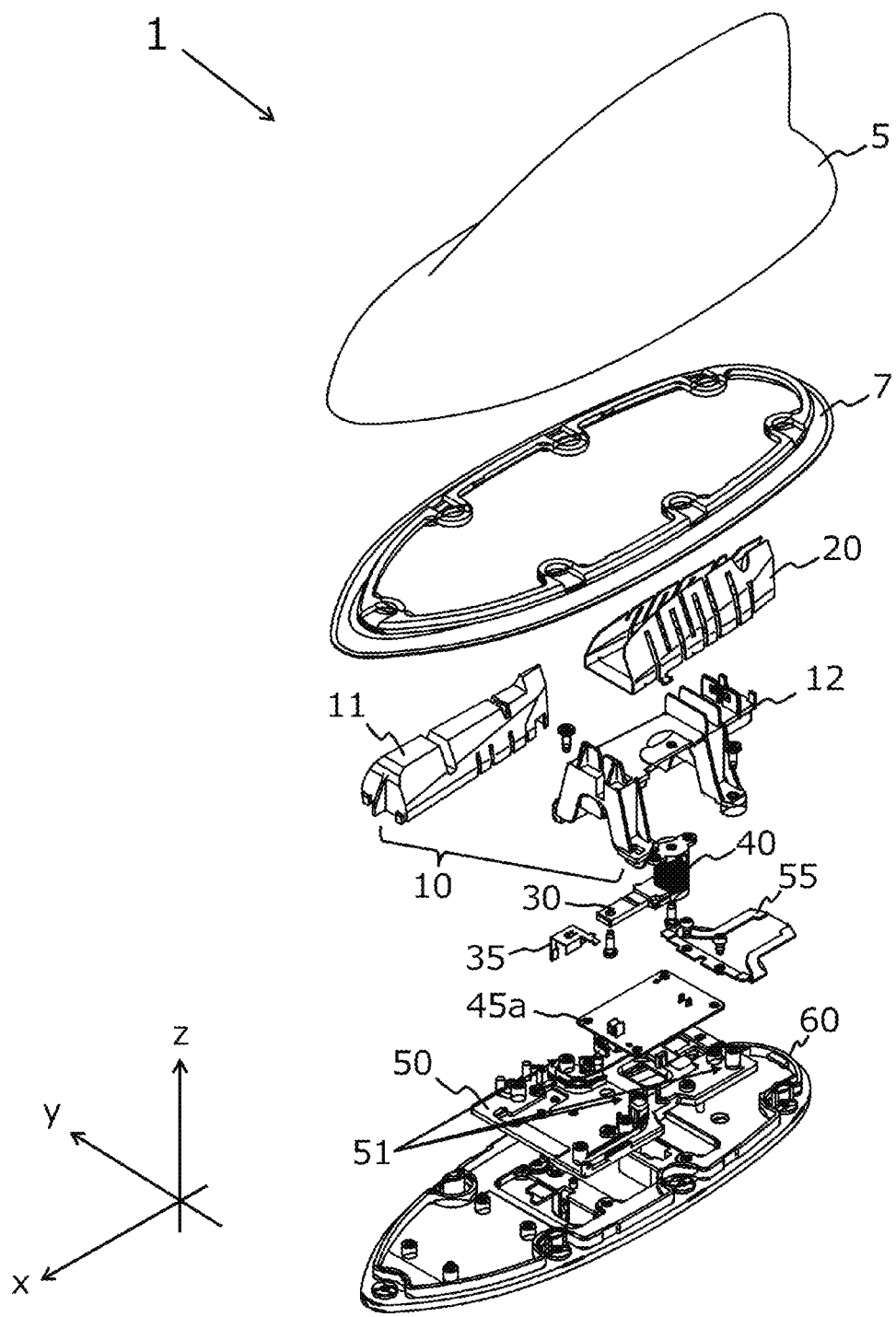
FIG. 2 is a perspective view when seen from above and illustrates a state before respective portions of the antenna device for the vehicle are assembled.

An antenna device 1 for a vehicle according to a first embodiment is attached to a top surface of a vehicle, such as a roof. For example, as illustrated in FIG. 1 and FIG. 2, the antenna device 1 for the vehicle includes an antenna case 5, a pad 7, a capacitance loading element holder 10 (an upper holder 11 and a lower holder 12), a capacitance loading element 20, a helical element holder 30, a connection metal fitting 35, a helical element 40, a first board 45a, a metal base 50, and a resin base 60.

Note that, in the following, a description will be provided while defining respective directions as follows: a front-rear direction of a vehicle to which the antenna device 1 for the vehicle is attached is an x direction; a right-left direction perpendicular to the x direction is a y direction; and a substantially vertical direction perpendicular to the x direction and the y direction is a z direction. Additionally, in FIG. 1, directions pointed by arrows of respective axes of x, y, and z are defined as a frontward direction, a rightward direction, and an upward direction, respectively.

The antenna case 5 is made from a synthetic resin having radio wave transmittivity, and has a shark fin shape in which, for example, it is inclined such that a height on the front side becomes lower than a height on a rear side in the x direction, and both side surfaces are curved inward.

The antenna case 5 is a member that has an open bottom surface and constitutes the antenna device 1 for the vehicle. As illustrated in FIG. 1 and FIG. 2, the antenna case 5 covers, from an upper side in the z direction, the pad 7, the capacitance loading element holder 10, the capacitance loading element 20, the helical element holder 30, the helical element 40, the first board 45a, the metal base 50, and the resin base 60, and the like.

Accordingly, the capacitance loading element 20 is housed in an internal space of the antenna case 5.

The antenna case 5 is attached to the resin base 60 by screwing or the like.

The pad 7 is an annular elastic member including elastomer, rubber, and the like. The pad 7 is sandwiched between a lower end peripheral portion of the antenna case 5 and the resin base 60. The pad 7 covers up a gap between the lower end peripheral portion of the antenna case 5 and the vehicle, and also prevents water from entering the antenna case 5.

The capacitance loading element holder 10 holds the capacitance loading element 20. For example, the capacitance loading element holder 10 is composed of the upper holder 11 and the lower holder 12 as illustrated in FIG. 1 and FIG. 2. The capacitance loading element holder 10 holds the capacitance loading element 20 by sandwiching the capacitance loading element 20 between the upper holder 11 and the lower holder 12. For example, the capacitance loading element holder 10 holds the capacitance loading element 20, by sandwiching or the like of a connecting portion 22 provided at a position lower than upper edges of a first element 21a and a second element 21b of the capacitance loading element 20 (see FIG. 2).

The capacitance loading element 20 is held by being sandwiched between the upper holder 11 and the lower holder 12. Therefore, compared to a configuration in which the capacitance loading element 20 is held by being sandwiched in the y direction, the capacitance loading element 20 is more hardly displaced in the vertical direction by vehicle vibration. Accordingly, it is possible to firmly fix the capacitance loading element 20 and make it hardly come off the capacitance loading element holder 10.

Figure 3:
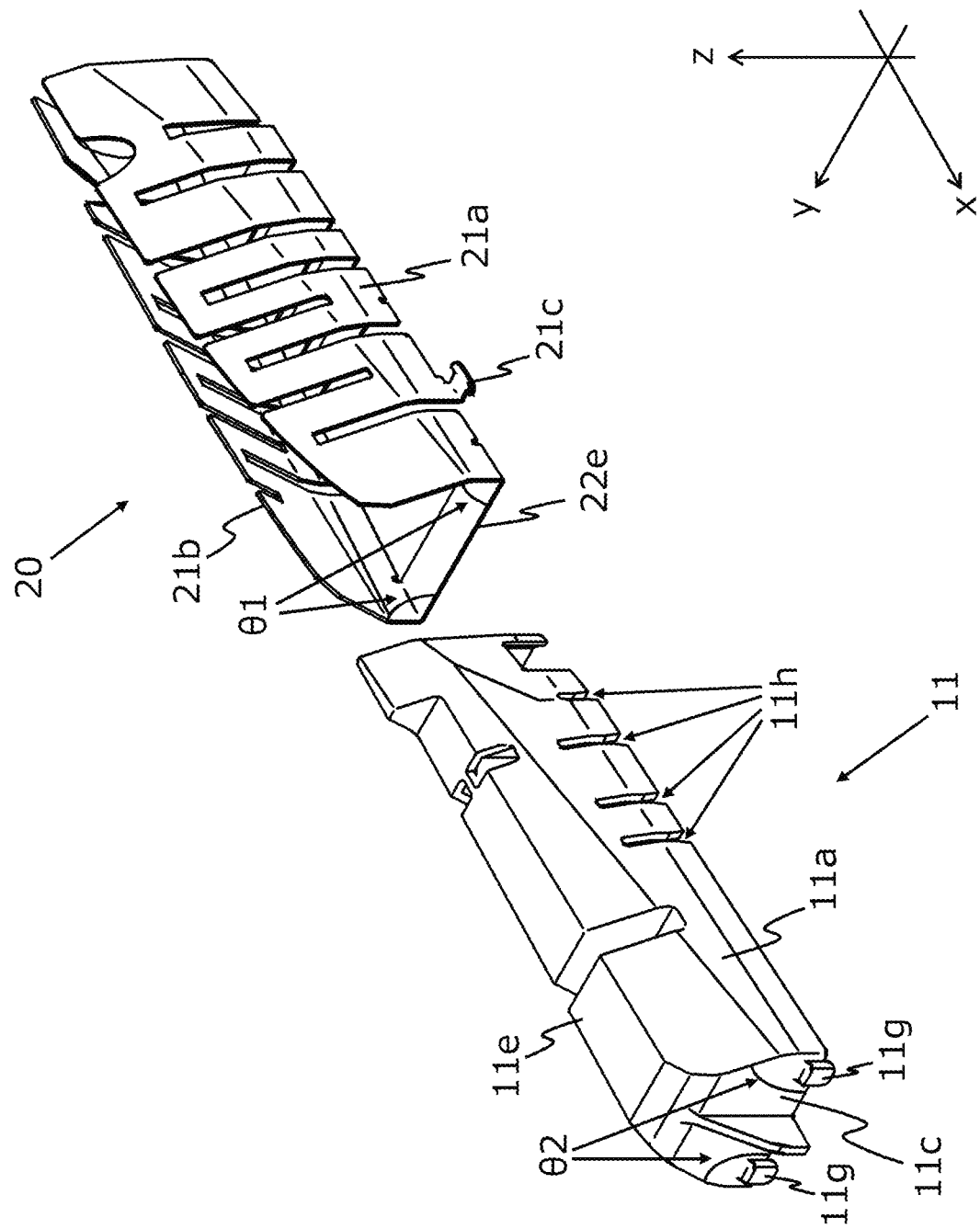
FIG. 3 is a perspective view of a capacitance loading element and an upper holder when seen from above and illustrates a state before the capacitance loading element is attached to the upper holder.

The capacitance loading element 20 is, for example, an AM/FM capacitance loading element. The capacitance loading element 20 is formed by processing a tin-plated steel plate (conductor plate). As illustrated in FIG. 3, the capacitance loading element 20 includes the first element 21a, the second element 21b, and the connecting portion 22. The first element 21a and the second element 21b of the capacitance loading element 20 are inclined such that lower portions thereof become distant from each other and upper portions thereof come close to each other when seen from the x direction. The first element 21a and the second element 21b are connected by a metal plate (the connecting portion 22) arranged at a lower portion. Said lower portion is located on a lower side in the z direction with respect to the upper edges of the first element 21a and the second element 21b.

Figure 4:
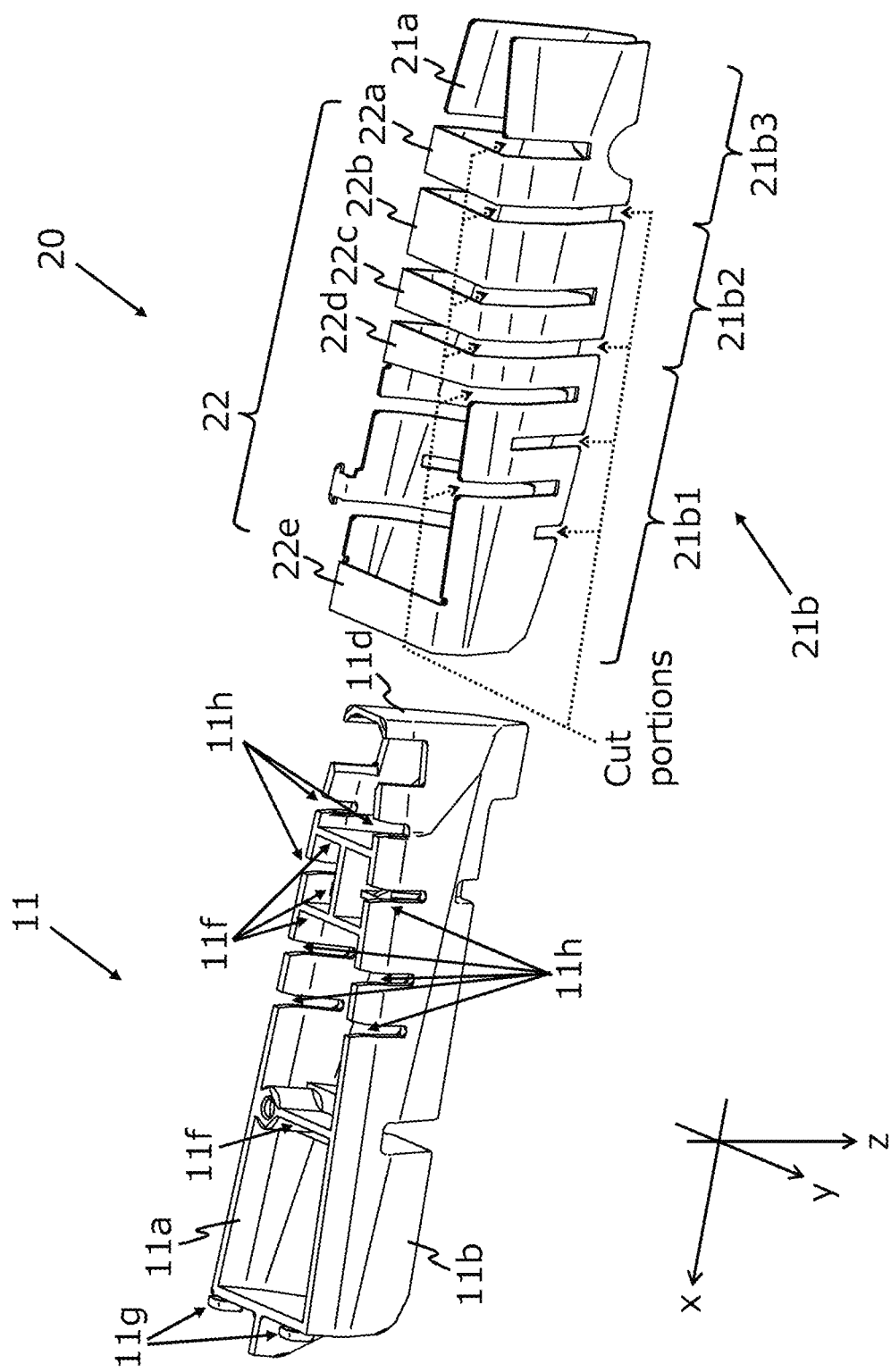
FIG. 4 is a perspective view of the capacitance loading element and the upper holder when seen from lower right and illustrates the state before the capacitance loading element is attached to the upper holder.
Figure 5:
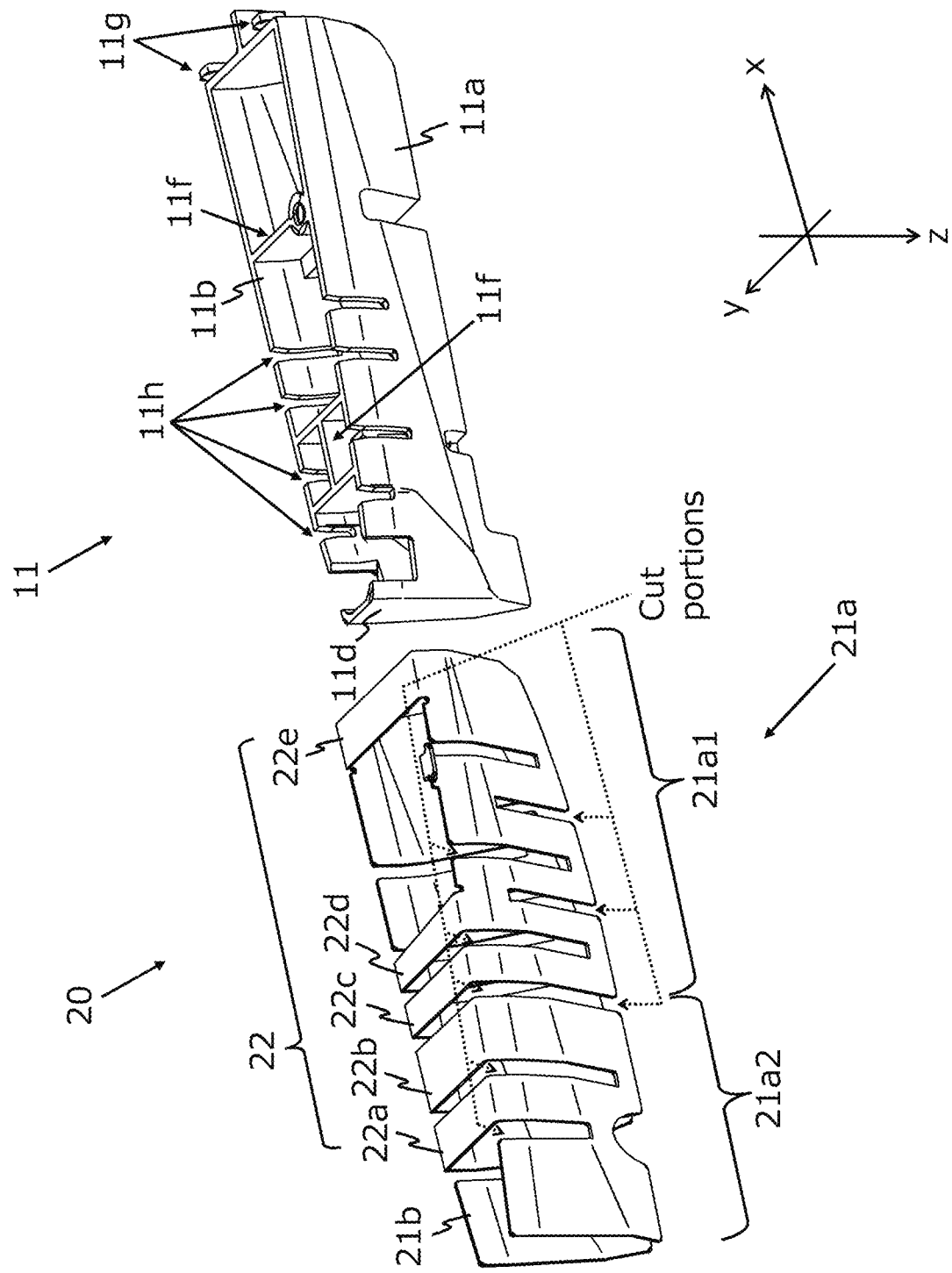
FIG. 5 is a perspective view of the capacitance loading element and the upper holder when seen from lower left and illustrates the state before the capacitance loading element is attached to the upper holder.

The first element 21a, the second element 21b, and the connecting portion 22 of the capacitance loading element 20 are formed by bending a single metal plate, or the like. Additionally, the first element 21a, the second element 21b, and the connecting portion 22 are formed in a meander shape. For example, the first element 21a, the second element 21b, and the connecting portion 22 are formed in a shape that meanders by bending the single metal plate as illustrated in FIG. 4 and FIG. 5. Furthermore, for example, in a case of assuming that the meander shape is formed by cutting or pressing the metal plate, a portion cut from the metal plate is defined as a cut portion. In the first element 21a and the second element 21b illustrated in FIG. 4 and FIG. 5, cut portions are indicated by dotted arrows.

Here, a plurality of metal plates constituting the connecting portion 22 is provided in the x direction. More specifically, as illustrated in FIG. 4 and FIG. 5, the metal plates constituting the connecting portion 22 include an eleventh metal plate 22a, a twelfth metal plate 22b, a thirteenth metal plate 22c, and a fourteenth metal plate 22d, and a fifteenth metal plate 22e.

Each of the first element 21a and the second element 21b has a substantially trapezoid (or a substantially triangle) outer shape as a whole when seen from the y direction. Here, in a case of assuming that the plurality of metal plates (the eleventh metal plate 22a to the fifteenth metal plate 22e) constituting the connecting portion 22 is detached, the first element 21a is composed of two metal plates (a first metal plate 21a1 and a second metal plate 21a2). Additionally, the second element 21b is composed of three metal plates (a third metal plate 21b1, a fourth metal plate 21b2, and a fifth metal plate 21b3). Note that the first element 21a, the second element 21b, and the connecting portion 22 may be individually formed and then connected to each other to form the capacitance loading element 20. Additionally, the number of metal plates included in the connecting portion 22 can be arbitrarily changed. Furthermore, a single metal plate may constitute the connecting portion 22.

Additionally, as illustrated in FIG. 3, a connection point 21c is provided in a place located in front and at a lower portion of the capacitance loading element 20 (the first element 21a in the first embodiment). The connection point 21c has a hook shape protruding leftward in the y direction. The helical element 40 is electrically connected to the capacitance loading element 20 at the connection point 21c by soldering or the like.

The capacitance loading element 20 and the helical element 40 which is described later constitute antenna elements that receive signals of an FM waveband and the like.

The helical element holder 30 is made of synthetic resin. The helical element holder 30 is used to hold the helical element 40 below the upper holder 11. As illustrated in FIG. 2, the connection metal fitting 35 is attached to the helical element holder 30.

The helical element 40 is composed of a conductor.

The helical element 40 has a spiral portion that functions as a wavelength shortening element. A connecting wire extending from an upper end of the spiral portion of the helical element 40 is connected to the connection point 21c of the capacitance loading element 20 by soldering. A connecting wire extending from a lower end of the spiral portion of the helical element 40 is connected by soldering to the connection metal fitting 35 provided in front in the x direction of the helical element holder 30.

The helical element 40 is arranged in a position that is located below the upper holder 11, at rear in the x direction with respect to the connection point 21c, and is deviated leftward in the y direction from an xz plane including a center line LX when seen from the rear in the x direction. The center line LX is a center line in the y direction of the capacitance loading element 20 and the capacitance loading element holder 10.

The first board 45a mounts an antenna amplifier that amplifies reception signals of the antenna elements (the capacitance loading element 20 and the helical element 40), and the like. The first board 45a is attached to an upper portion of the metal base 50 by screwing.

A cable (not illustrated) electrically connected to the first board 45a extends to the vehicle roof through cable holes provided at the metal base 50 and the resin base 60 respectively.

The metal base 50 holds the lower holder 12 and the first board 45a. As illustrated in FIG. 2, a rear metal base 55 is attached to the rear in the x direction of the metal base 50. Additionally, protrusions 51 are provided in the metal base 50 as illustrated in FIG. 2.

The resin base 60 holds the metal base 50.

A seal member (not illustrated) which is made of annular elastic member including elastomer, rubber, urethane foam, and the like is provided on a bottom surface of the resin base 60. The seal member provides watertight sealing at a periphery of a region located between the resin base 60 and the vehicle roof and provided with an attachment hole.

The upper holder 11 and the lower holder 12 of the antenna device 1 for the vehicle hold the capacitance loading element 20, for example, by sandwiching the connecting portion 22 provided at a position lower than the upper edges of the first element 21a and the second element 21b of the capacitance loading element 20. More specifically, the upper holder 11 holds the first element 21a and the second element 21b. The upper holder 11 and the lower holder 12 sandwich and hold the connecting portion 22. The upper holder 11 fits into the capacitance loading element 20. The upper holder 11 and the capacitance loading element 20 which have been fitted each other are further fitted to the lower holder 12.

After the upper holder 11 and the capacitance loading element 20 are fitted to the lower holder 12, the helical element holder 30 having the helical element 40 attached is attached to the capacitance loading element 20. Then, the lower holder 12 is attached to the metal base 50.

Figure 14:
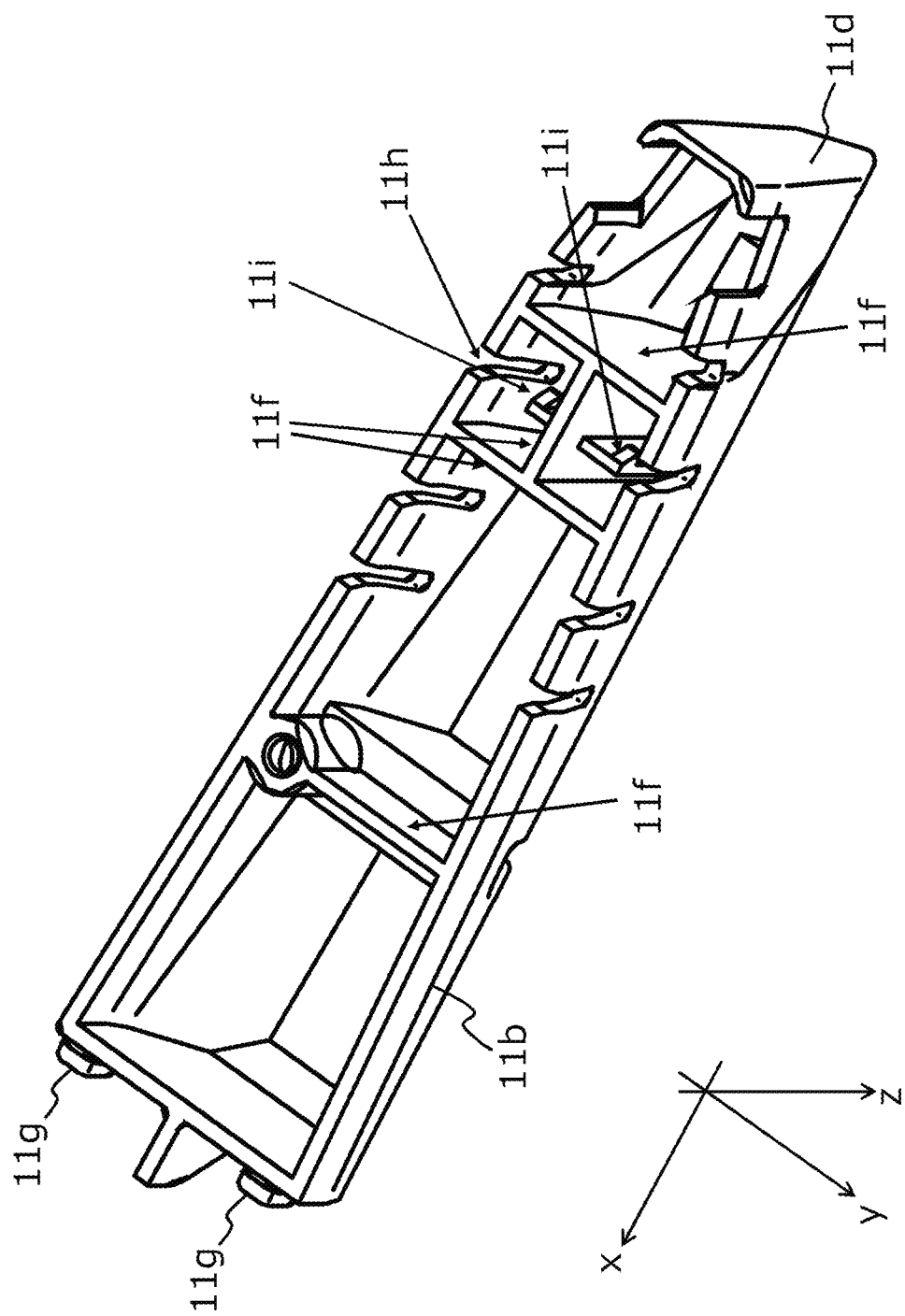
FIG. 14 is a perspective view of the upper holder when seen from below.

The details of attachment of the respective portions will be described below. First, the fit between the upper holder 11 and the capacitance loading element 20 will be described. FIG. 3 illustrates a perspective view of the upper holder 11 and the capacitance loading element 20 when seen from an obliquely upper side in the z direction. FIG. 14 illustrates a view of the upper holder 11 when seen from the lower side in the z direction. For example, as illustrated in FIG. 3 and FIG. 14, a bottom surface of the upper holder 11 is open. The upper holder 11 has a first side portion 11a, a second side portion 11b, a front surface portion 11c, a rear surface portion 11d, and an upper surface portion 11e. The first side portion 11a constitutes a left side surface when seen from the rear in the x direction. The second side portion 11b constitutes a right side surface when seen from the rear in the x direction.

As illustrated in FIG. 3 to FIG. 5, a cross section of the upper holder 11 when seen from the x direction has a substantially isosceles trapezoid outer shape. In said substantially isosceles trapezoid, a width in the y direction is wide on a lower side in the z direction, and a width in the y direction is narrow on an upper side in the z direction.

Additionally, as illustrated in FIG. 3 to FIG. 5, the upper holder 11 has a shape in which a width in the y direction is gradually narrowed toward the rear in the x direction from the front in the x direction.

As illustrated in FIG. 3 to FIG. 5, the capacitance loading element 20 has a shape in which a width in the y direction is gradually narrowed toward the rear in the x direction from the front in the x direction.

Specifically, as the connecting portion 22, the plurality of metal plates (the eleventh metal plate 22a to the fifteenth metal plate 22e) is arrayed such that a metal plate located at the front in the x direction has a wider width in the y direction than a metal plate located at the rear in the x direction. The first element 21a and the second element 21b are arranged in a positional relation in which the first element 21a and the second element 21b are located closer to each other in the y direction at the rear in the x direction than at the front in the x direction.

Additionally, the width in the y direction of the capacitance loading element 20 at the front in the x direction is wider than the width in the y direction of the upper holder 11 at the rear in the x direction.

Figure 6:
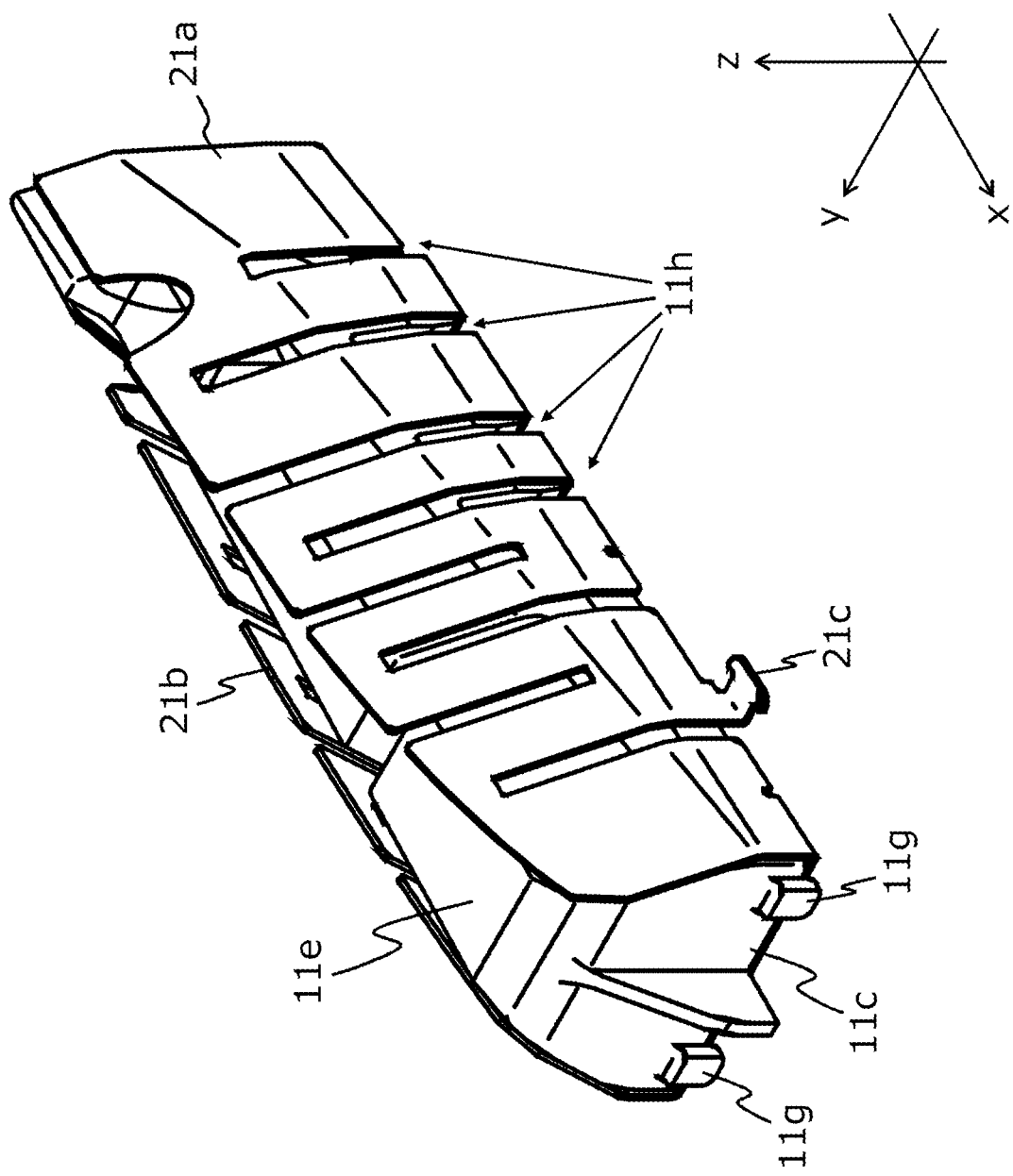
FIG. 6 is a perspective view of the capacitance loading element and the upper holder when seen from above and illustrates a state where the capacitance loading element is attached to the upper holder.
Figure 7:
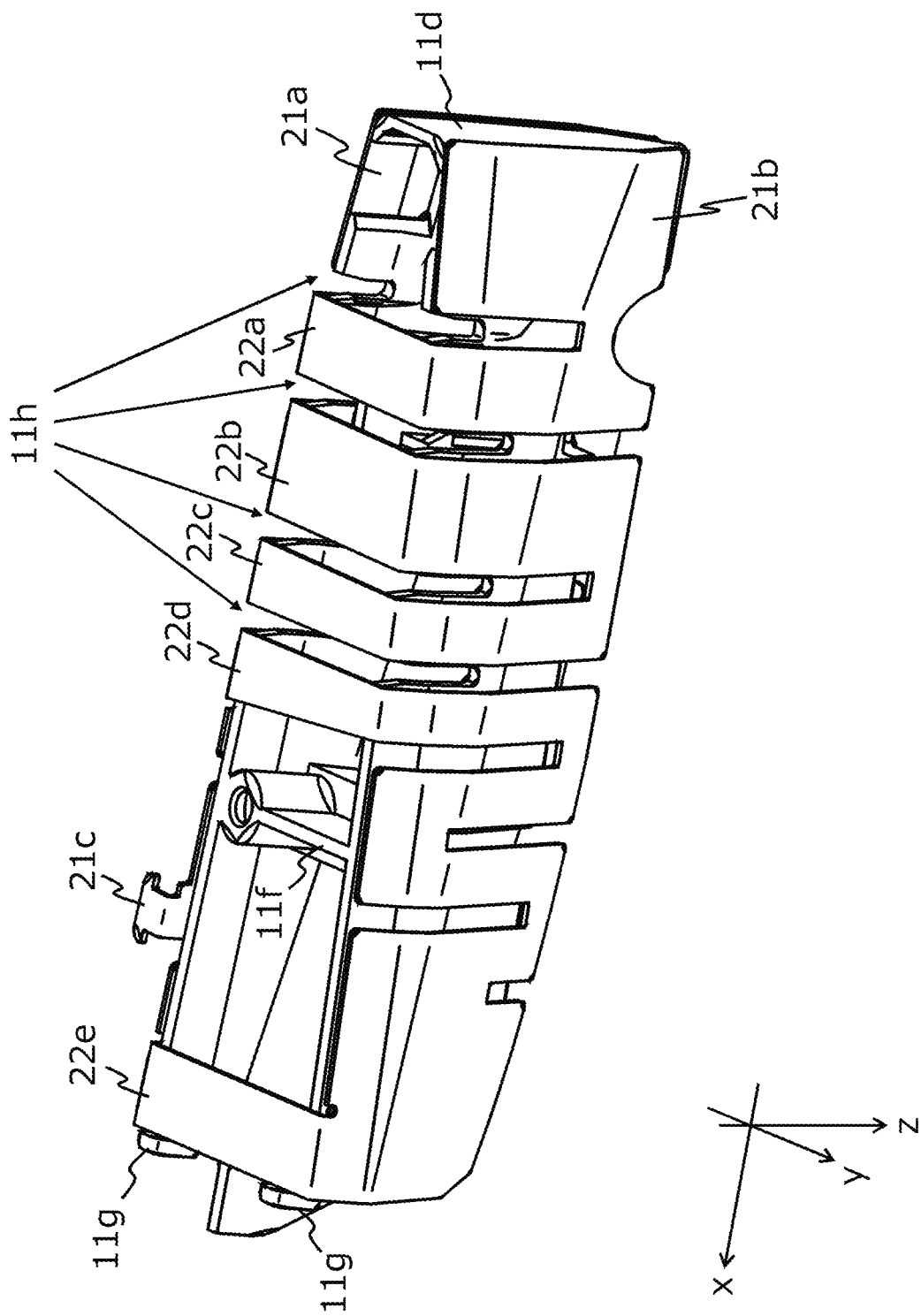
FIG. 7 is a perspective view of the capacitance loading element and the upper holder when seen from the lower right and illustrates the state where the capacitance loading element is attached to the upper holder.
Figure 8:
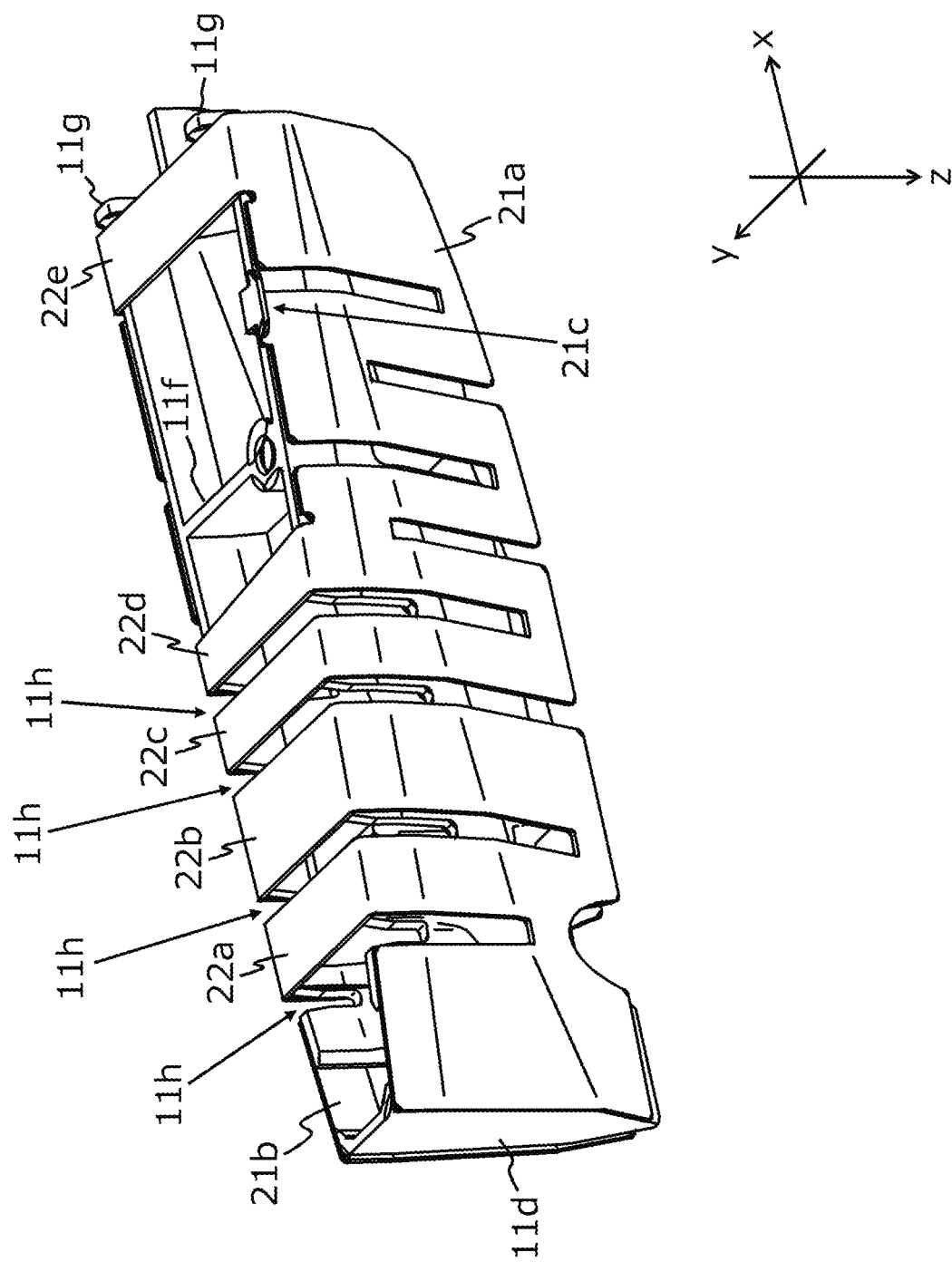
FIG. 8 is a perspective view of the capacitance loading element and the upper holder when seen from the lower left and illustrates the state where the capacitance loading element is attached to the upper holder.
Figure 9:
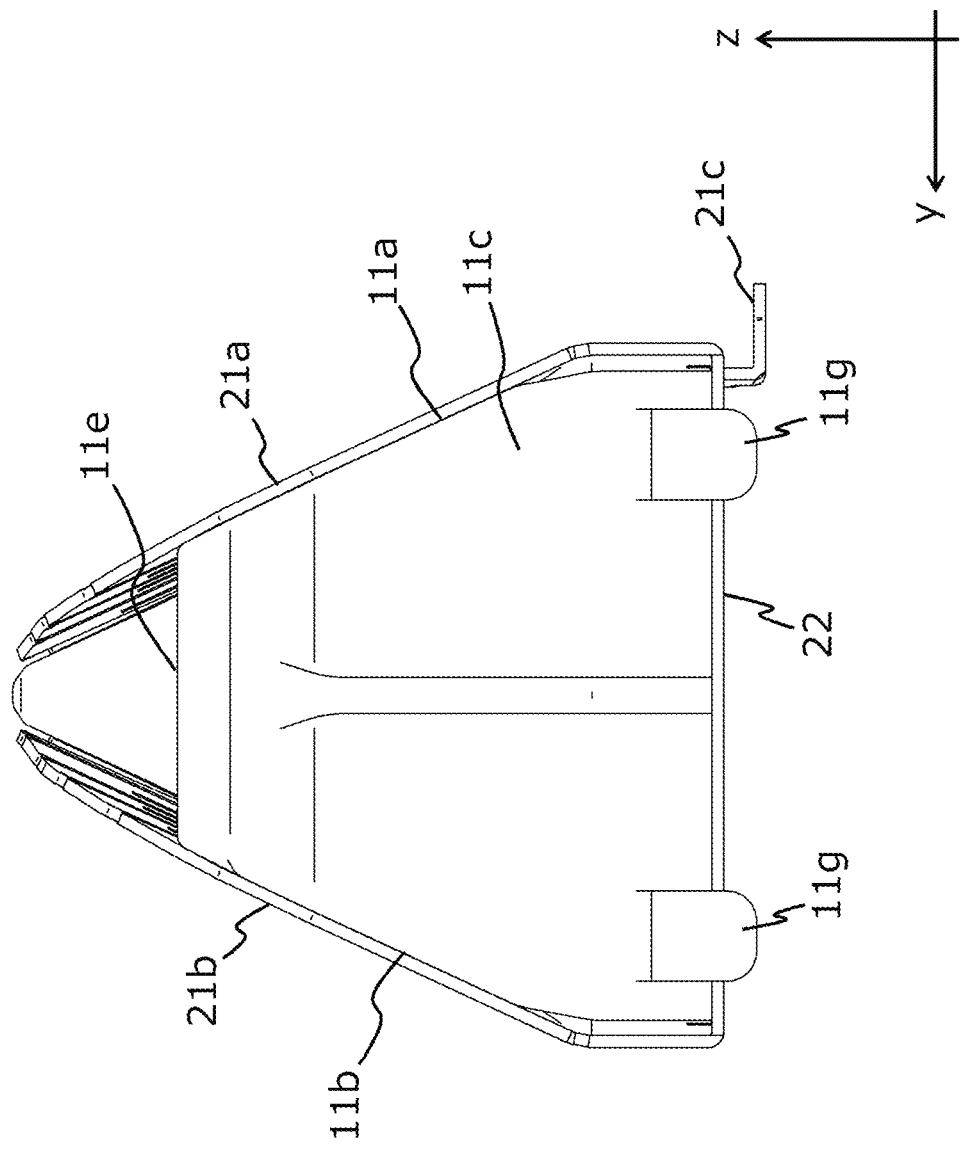
FIG. 9 is a front view of the capacitance loading element and the upper holder and illustrates the state where the capacitance loading element is attached to the upper holder.

Therefore, the capacitance loading element 20 can be easily attached to the upper holder 11 by inserting the front in the x direction of the capacitance loading element 20 from the rear in the x direction of the upper holder 11. For example, the upper holder 11 is fitted into the capacitance loading element 20 as illustrated in FIG. 6 to FIG. 8. Note that FIG. 6 to FIG. 8 illustrate a state where the upper holder 11 and the capacitance loading element 20 are fitted each other.

As illustrated in FIG. 3, a stopper 11g is provided at a front end in the x direction of the upper holder 11. In other words, the stopper 11g protruding further downward in the z direction than other members of the upper holder 11 is provided at the front surface portion 11c. This stopper 11g locks a front end in the x direction of the connecting portion 22 (the fifteenth metal plate 22e) of the capacitance loading element 20. Therefore, when the capacitance loading element 20 is inserted from the rear in the x direction of the upper holder 11, it is possible to suppress insertion of the capacitance loading element 20 to the front in the x direction by a predetermined amount or more. Additionally, position alignment to a predetermined position can be easily performed. Furthermore, productivity of the antenna device 1 for the vehicle can be improved.

Additionally, since the stopper 11g is provided, a fixed position of the capacitance loading element 20 with respect to the capacitance loading element holder 10 can be made constant. Furthermore, electric performance of the capacitance loading element 20 can be prevented from becoming unstable (having larger individual differences) due to variability in production of the antenna devices 1 for the vehicle.

Furthermore, since the stopper 11g is provided, it is possible to suppress displacement of the fixed position of the capacitance loading element 20, with respect to the capacitance loading element holder 10, from an appropriate fixed position by vehicle vibration. Moreover, it is possible to suppress deterioration in the electric performance of the capacitance loading element 20 caused by said displacement.

Additionally, an inclination (a first angle θ1) of the first element 21a when seen from the x direction in a state before the capacitance loading element 20 is attached to the upper holder 11 is smaller than an inclination (a second angle θ2) of the first side portion 11a when seen from the x direction (θ1<θ2, see FIG. 3). The first angle θ1 referred to in this paragraph is an angle formed by a region from a lower edge to an upper edge of the first element 21a with respect to the metal base 50. Additionally, the second angle θ2 is an angle formed by a region from a lower edge to an upper edge of the first side portion 11a with respect to the metal base 50.

Similarly, as illustrated in FIG. 3, an inclination (the first angle θ1) of the second element 21b when seen from the x direction in a state before the capacitance loading element 20 is attached to the upper holder 11 is smaller than an inclination (the second angle θ2) of the second side portion 11b when seen from the x direction (θ1<θ2). The first angle θ1 referred to in this paragraph is an angle formed by a region from a lower edge to the upper edge of the second element 21b with respect to the metal base 50. Additionally, the second angle θ2 is an angle formed by a region from a lower edge to an upper edge of the second side portion 11b with respect to the metal base 50.

Consequently, when the capacitance loading element 20 is attached to the upper holder 11, reaction force is applied by the upper holder 11 such that the upper portions of the first element 21a and the second element 21b separate from each other outward in the y direction. Then, this reaction force biases the first element 21a and the second element 21b so as to come close to each other inward in the y direction. With this biasing, the capacitance loading element 20 is brought into a state of firmly contacting the upper holder 11.

Therefore, it is possible to prevent an upper edge of the capacitance loading element 20 from being opened by vehicle vibration, and the capacitance loading element 20 from contacting the antenna case 5 or the like, and generating abnormal noise.

Furthermore, the fixed position of the capacitance loading element 20 with respect to the capacitance loading element holder 10 is hardly displaced from the appropriate fixed position by the vehicle vibration. As a result, it is possible to suppress deterioration in the electric performance of the capacitance loading element 20 caused by said displacement.

Additionally, dimensions of the upper holder 11 and the capacitance loading element 20 are determined so as to satisfy following conditions. When the upper holder 11 is fitted into the capacitance loading element 20, at least the first element 21a of the capacitance loading element 20 contacts the first side portion 11a of the upper holder 11, the second element 21b of the capacitance loading element 20 contacts the second side portion 11b of the upper holder 11, and the upper holder 11 fills a large part of an inner region of the capacitance loading element 20. The inner region of the capacitance loading element 20 is a region surrounded by the first element 21a, the second element 21b, and the connecting portion 22. The large part of the inner region of the capacitance loading element 20 is, for example, a half or more of the inner region of the capacitance loading element 20.

Most parts of the first element 21a and the second element 21b contact the upper holder 11. Therefore, compared to a configuration in which these elements do not contact the upper holder, an amplitude of vibration caused by vehicle vibration is smaller in the capacitance loading element 20, particularly, at a portion not contacting the upper holder 11, such as the upper edges of the first element 21a and the second element 21b. As a result, it is possible to prevent the capacitance loading element 20 from contacting the antenna case 5 and generating the abnormal noise.

As illustrated in FIG. 3 to FIG. 5 and FIG. 10, each of the first element 21a and the second element 21b of the capacitance loading element 20 has the substantially trapezoid (or the substantially triangle) outer shape as the whole when seen from the y direction. Additionally, each of the first element 21a and the second element 21b is partly formed in the meander shape. This meander shape extends upward in the z direction from a lower end portion of each of the first element 21a and the second element 21b of the capacitance loading element 20. Note that the meander shape may also extend downward in the z direction from an upper end portion of each of the first element 21a and the second element 21b of the capacitance loading element 20.

Figure 11:
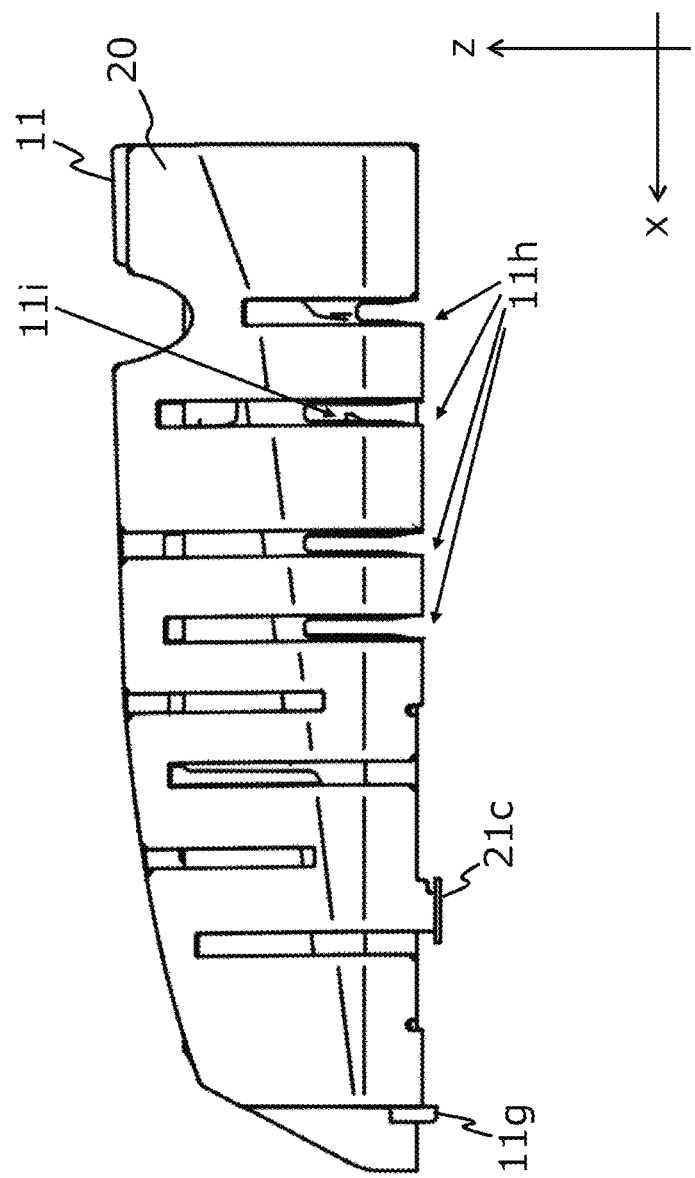
FIG. 11 is a side view of the capacitance loading element and the upper holder and illustrates the state where the capacitance loading element is attached to the upper holder.

The first side portion 11a and the second side portion 11b of the upper holder 11 are provided with slits 11h extending upward in the substantially z direction from lower end portions. The positions provided with the slits 11h overlap with positions of the cut portions of the first element 21a and the second element 21b, for example, as illustrated in FIG. 11.

That is, each slit 11h provided at the first side portion 11a is provided at a position facing, in the y direction, one of the cut portions which are generated at the first element 21a by forming the first element 21a in the meander shape and extend upward in the z direction from the lower end portion. Additionally, each slit 11h provided at the second side portion 11b is provided at a position facing, in the y direction, one of the cut portions which are generated at the second element 21b by forming the second element 21b in the meander shape and extend upward in the z direction from the lower end portion.

Note that a slit 11h of the first side portion 11a and a slit 11h of the second side portion 11b are arranged in a positional relation of facing each other in the y direction. Note that, as far as the slits 11h are provided at positions overlapping with the cut portions of the first element 21a and the second element 21b, the number of slits 11h and the number of cut portions of the first element 21a and the second element 21b can be arbitrary changed. Note that the slit 11h of the first side portion 11a and the slit 11h of the second side portion 11b are not necessarily arranged in the positional relation of facing each other. In such a case, position of the slit 11h of the first side portion 11a and the slit 11h of the second side portion 11b are determined such that the respective positions overlap with the meander shape. Also, a slit 11h may be provided only on one of the first side portion 11a and the second side portion 11b.

Figure 10:
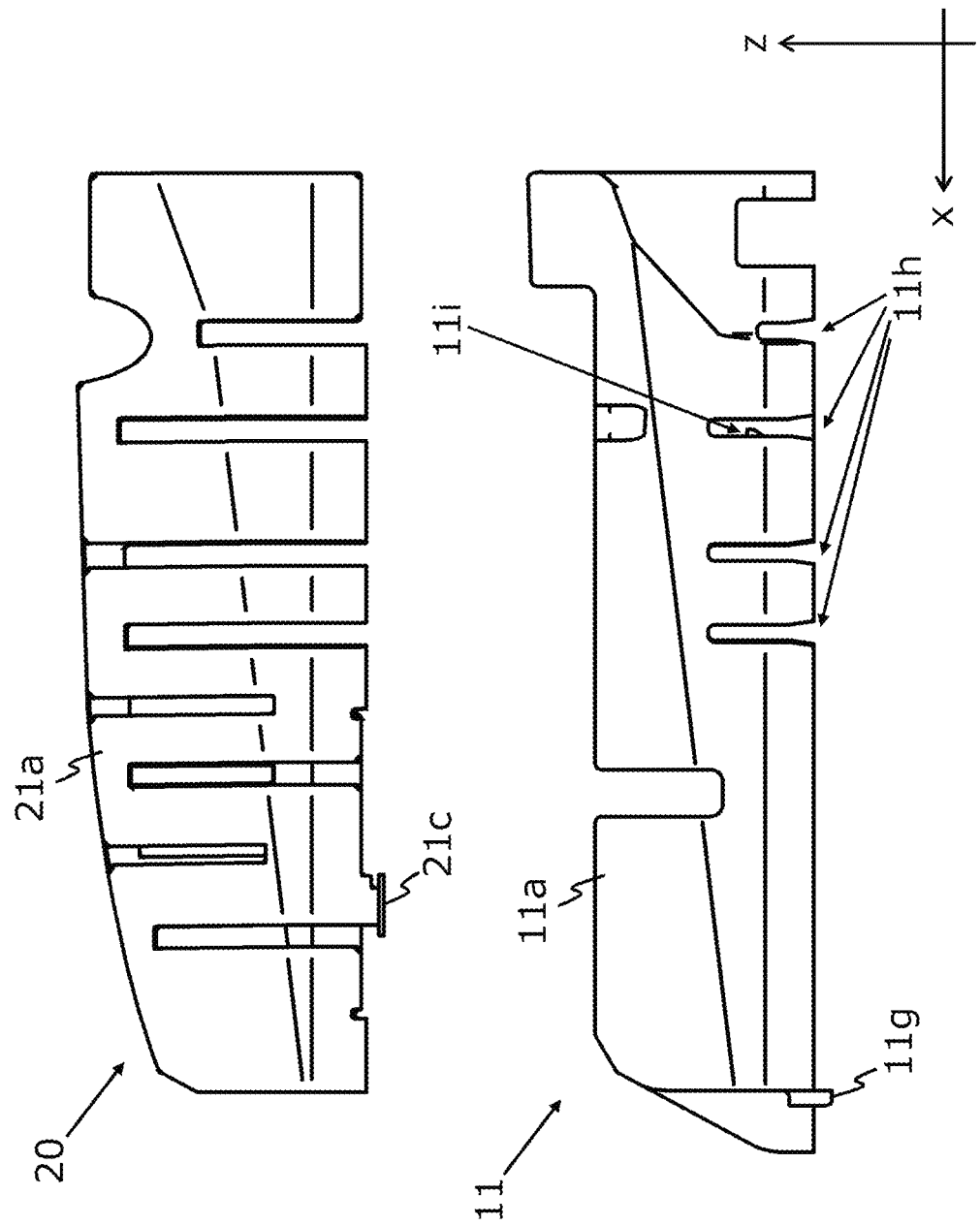
FIG. 10 is a side view of the capacitance loading element and the upper holder and illustrates the state before the capacitance loading element is attached to the upper holder.

Additionally, as illustrated in FIG. 10, a first fitting claw 11i is provided between one slit 11h of the first side portion 11a and a slit 11h of the second side portion 11b facing this one slit 11h in the y direction. The first fitting claw 11i extends downward in the z direction from a bottom surface of the upper surface portion 11e. The first fitting claw 11i will be described later. Additionally, the number of the first fitting claws 11i can be arbitrarily changed.

Figure 12:
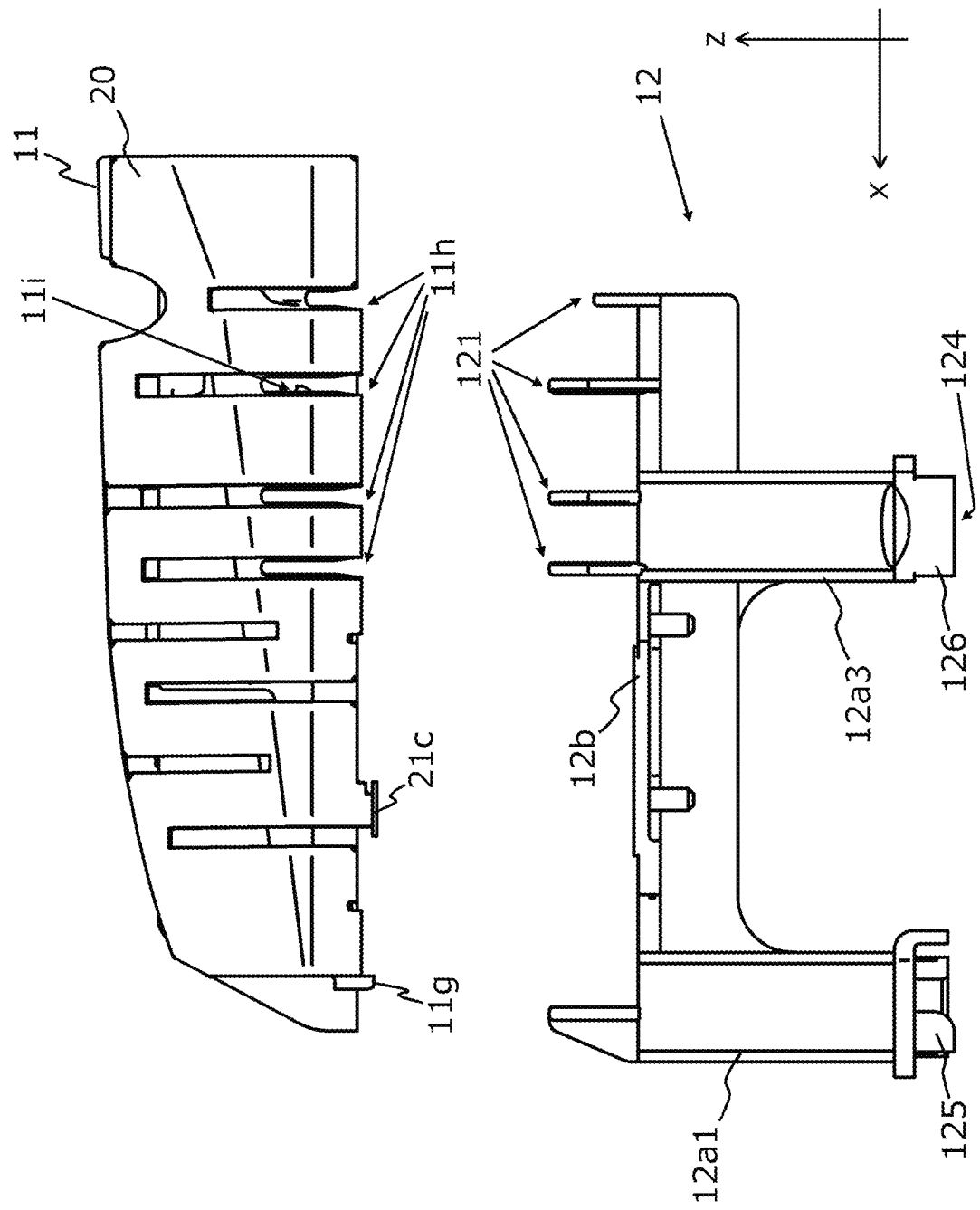
FIG. 12 is a side view of the capacitance loading element, the upper holder, and a lower holder, and illustrates a state before the upper holder having the capacitance loading element attached is attached to the lower holder.

Fitting the upper holder 11 and the capacitance loading element 20 into the lower holder 12 will be described. As illustrated in FIG. 12, the lower holder 12 includes four leg portions, a top plate 12b, and ribs 121. Said four leg portions include a first leg portion 12a1 to a fourth leg portion 12a4. The top plate 12b is provided at an upper portion of said four leg portions. The ribs 121 are provided at an upper portion of the top plate 12b. Note that FIG. 12 illustrates only the first leg portion 12a1 and the third leg portion 12a3 among the four leg portions.

The upper holder 11 and the lower holder 12 are attached by fitting the ribs 121 of the lower holder 12 into the slits 11h of the upper holder 11. Here, the ribs 121 of the lower holder 12 are fitted into the slits 11h of the upper holder 11 in a state where the slits 11h of the upper holder 11 overlap with the meander shape of the capacitance loading element 20. Consequently, the connecting portion 22 of the capacitance loading element 20 is brought into a state of being sandwiched between the lower edge of the upper holder 11 and the top plate 12b of the lower holder 12.

As described above, the slits 11h overlap with the cut portions of the first element 21a and the second element 21b. Additionally, the ribs 121 of the lower holder 12 are fitted into the slits 11h of the upper holder 11 and the cut portions of the first element 21a and the second element 21b. Consequently, compared to a configuration in which the upper holder 11 is not provided with the slits 11h and the lower holder 12 is not provided with the ribs 121, vibration of the capacitance loading element 20 in the x direction by vehicle vibration can be further prevented. As a result, it is possible to prevent the capacitance loading element 20 from contacting the antenna case 5 and generating the abnormal noise.

Additionally, compared to a configuration in which the connecting portion 22 is fixed to an upper portion of the capacitance loading element holder 10, the capacitance loading element 20 can be more firmly fixed to the capacitance loading element holder 10 in a state where the capacitance loading element 20 hardly comes off. That is, it is possible to keep the state where the capacitance loading element 20 is fixed at the appropriate position. As a result, it is possible to prevent said fixed state from being released and the capacitance loading element 20 from contacting the antenna case 5 and generating the abnormal noise.

Additionally, by making the capacitance loading element 20 hardly moved in the x direction, the fixed position of the capacitance loading element 20 with respect to the capacitance loading element holder 10 can be made constant. As a result, the electric performance of the capacitance loading element 20 can be prevented from becoming unstable (having the larger individual differences) due to variability in production of the antenna devices 1 for the vehicle.

Additionally, the connecting portion 22 is provided at the position lower than the upper edges of the first element 21a and the second element 21b. Therefore, compared to a configuration in which the connecting portion 22 is provided at the upper edges of the first element 21a and the second element 21b, a position where the connecting portion 22 is sandwiched between the upper holder 11 and the lower holder 12 can be further lowered, and this can contribute to height reduction of the antenna device 1 for the vehicle.

Figure 13:
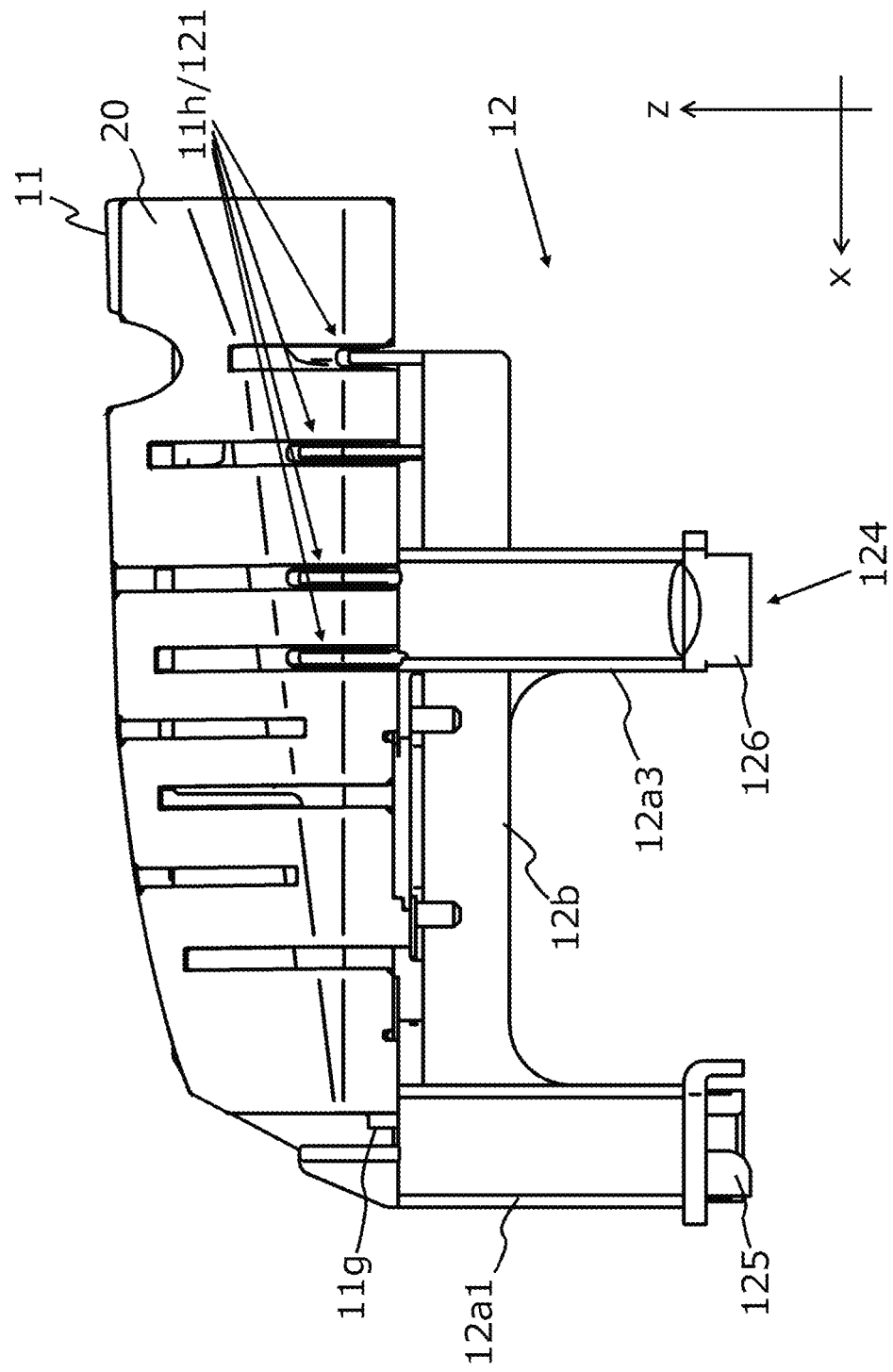
FIG. 13 is a side view of the capacitance loading element, the upper holder, and the lower holder, and illustrates a state where the upper holder having the capacitance loading element attached is attached to the lower holder.

Additionally, each rib 121 is formed in a plate shape perpendicular to the x direction. The ribs 121 are provided at the positions facing the slits 11h of the upper holder 11 in the z direction. Therefore, when the upper holder 11 is attached to the lower holder 12, the ribs 121 are fitted into the slits 11h as illustrated in FIG. 13, for example. Accordingly, compared to a configuration in which the slits 11h and the ribs 121 are not provided, the upper holder 11 and the lower holder 12 can be more reliably fixed.

Figure 16:
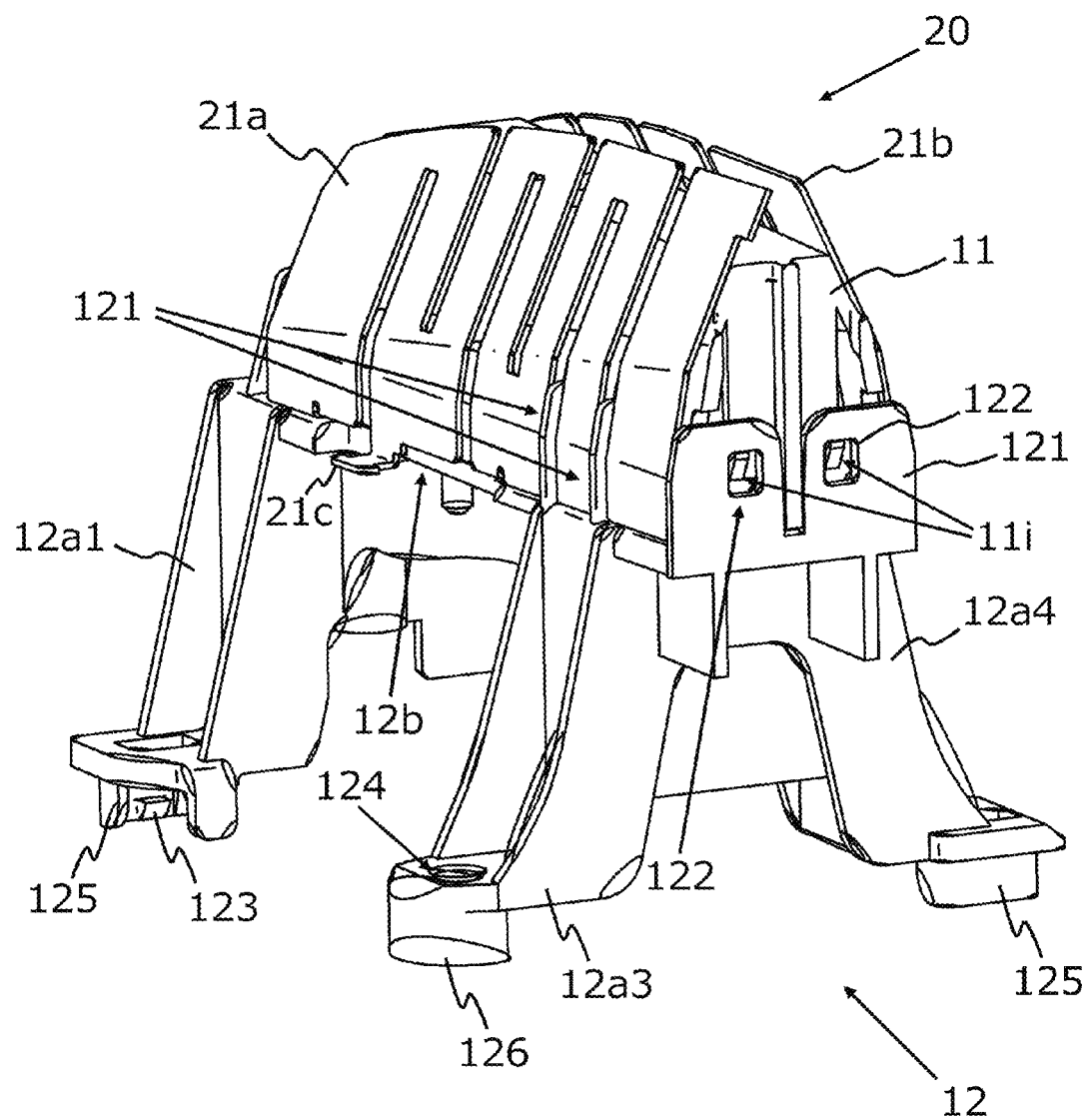
FIG. 16 is a perspective view of the capacitance loading element, the upper holder, and the lower holder, and illustrates a state where the upper holder having the capacitance loading element attached is attached to the lower holder, and also is the view illustrating only the portion located in front of the portion including the first fitting claw and the fitting hole.

Additionally, among the ribs 121, a rib fitted into the slit 11h provided with the first fitting claws 11i includes a fitting hole 122 to fit into the first fitting claw 11i as illustrated in FIG. 16.

The first fitting claw 11i and the fitting hole 122 can be snap-fastened by fitting. Therefore, compared to a configuration in which no fitting claw or the like is provided for the snap fastening, the upper holder 11 and the lower holder 12 can be more reliably fixed.

Furthermore, in a case where a slit 11h of the first side portion 11a and a slit 11h of the second side portion 11b are arranged in a positional relation of facing each other, a width in the y direction of a lower end portion of each rib 121 is longer than a distance described below. Said distance is a distance in the y direction of a region in each of the lower end portions of the slit 11h of the first side portion 11a and the slit 11h of the second side portion 11b, the region facing the rib 121 of the upper holder 11.

Consequently, when the rib 121 is fitted into the slit 11h, the rib 121 is fitted into the slit that constitutes the meander shape of the capacitance loading element 20 and that extends upward in the z direction from the lower end portion.

The upper holder 11 has an inner wall provided with a reinforcing rib 11f that is substantially perpendicular to the x direction or the y direction. The reinforcing rib 11f enhances structural strength of the upper holder 11.

Figure 17:
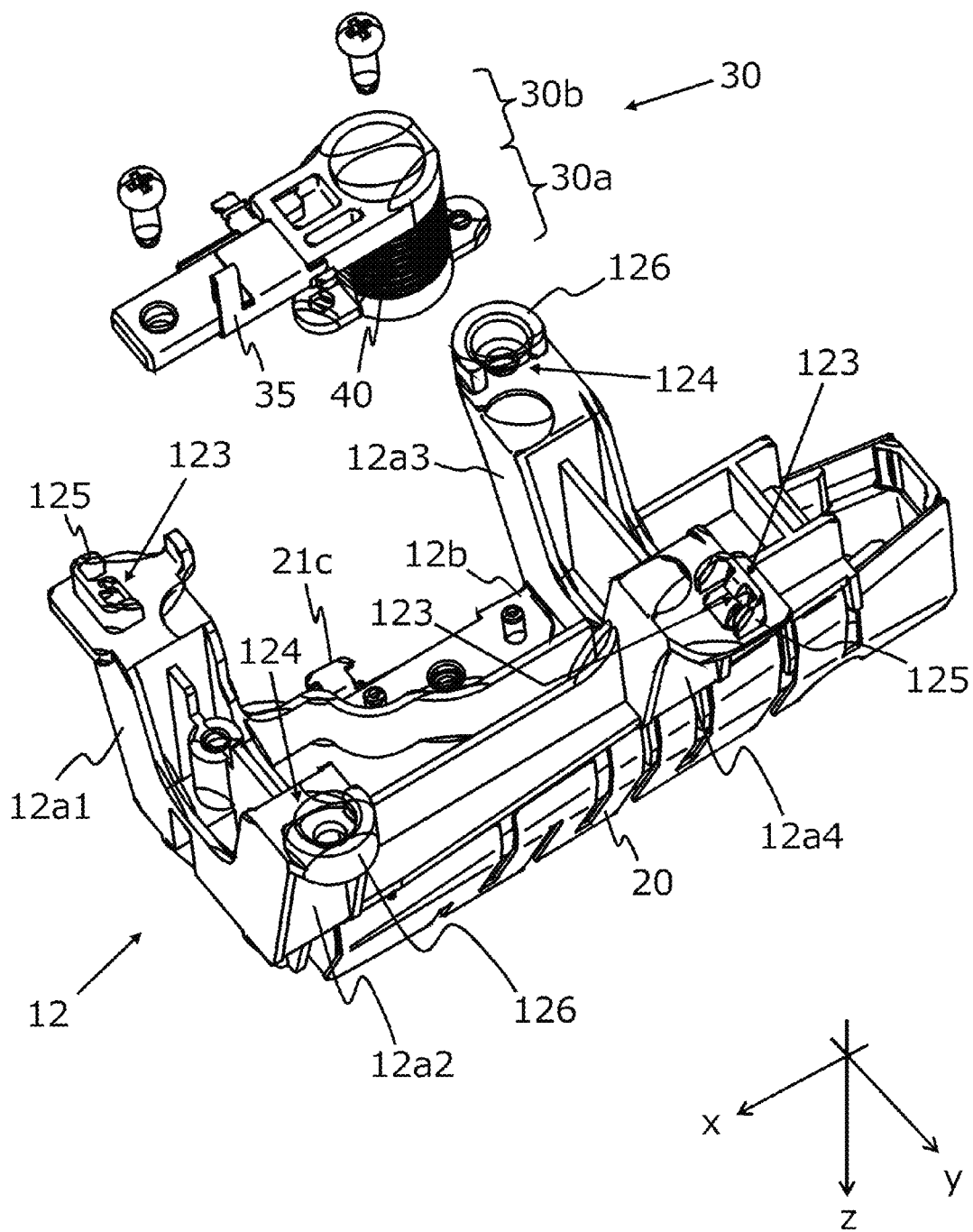
FIG. 17 is a perspective view of a helical element, a helical element holder, the lower holder, the upper holder, and the capacitance loading element when seen from below, and illustrates a state before the helical element holder having the helical element attached is attached to the lower holder.
Figure 18:
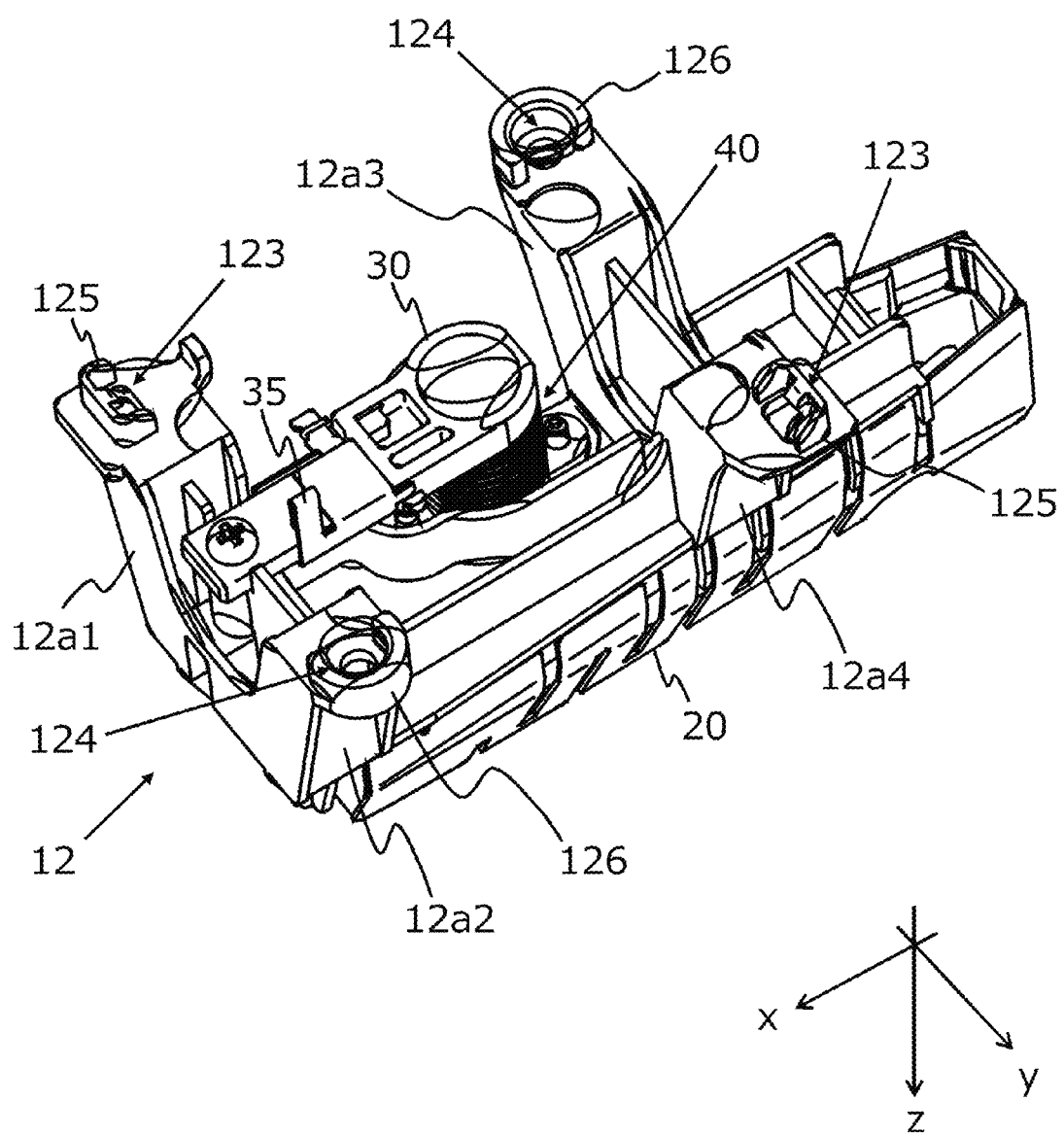
FIG. 18 is a perspective view of the helical element, the helical element holder, the lower holder, the upper holder, and the capacitance loading element when seen from below, and illustrates a state where the helical element holder having the helical element attached is attached to the lower holder.

Connection between the helical element holder 30 and the capacitance loading element 20 will be described. As illustrated in FIG. 17, the helical element holder 30 includes a first region (bobbin) 30a and a second region 30b. The first region 30a has a substantially cylindrical shape. The helical element 40 is wound around the first region 30a. The second region 30b is located at a portion lower than the first region 30a. The connection metal fitting 35 is attached to a front end portion of the second region 30b.

The helical element holder 30 is fixed to the upper holder 11 by screwing via a screw hole provided in the first region 30a, and a screw hole provided in the lower holder 12. Additionally, the helical element 40 is soldered to the capacitance loading element 20.

The capacitance loading element 20 is attached to the upper holder 11 in the state where the connecting portion 22 at the lower end is sandwiched between the upper holder 11 and the lower holder 12. Additionally, the helical element holder 30 that holds the helical element 40 is fixed to the upper holder 11 by screwing via the lower holder 12. Therefore, compared to a configuration in which the helical element holder 30 is fixed to the lower holder 12 by snap fastening, the fixed state of the capacitance loading element 20 and the helical element 40 is more hardly unfixed. Additionally, compared to a configuration in which the helical element holder 30 is fixed to the lower holder 12 by the snap fastening, electrical connection between the helical element 40 and the capacitance loading element 20 is hardly disconnected by vehicle vibration. That is, the soldered portion is hardly damaged.

Furthermore, as illustrated in FIG. 17, the connection metal fitting 35 is attached to an end portion at the front in the x direction of the second region 30b.

A region of the connection metal fitting 35, which is connected to the second region 30b, is provided with a protrusion protruding leftward in the y direction when seen from the rear in the x direction. Said protrusion is electrically connected to the connecting wire extending from a lower end of the helical element 40.

A portion of the connection metal fitting 35, which extends downward in the z direction from a front end portion thereof, is sandwiched between clamping conductor leaf springs provided on the first board 45a. The clamping conductor leaf springs protrude upward in the z direction from the first board 45a. The first board 45a and the connection metal fitting 35 are electrically connected by said clamping.

The connection between the first board 45a and the connection metal fitting 35 is not limited to the clamping conductor leaf springs, and another configuration may also be employed as far as electrical connection can be provided.

Figure 15:
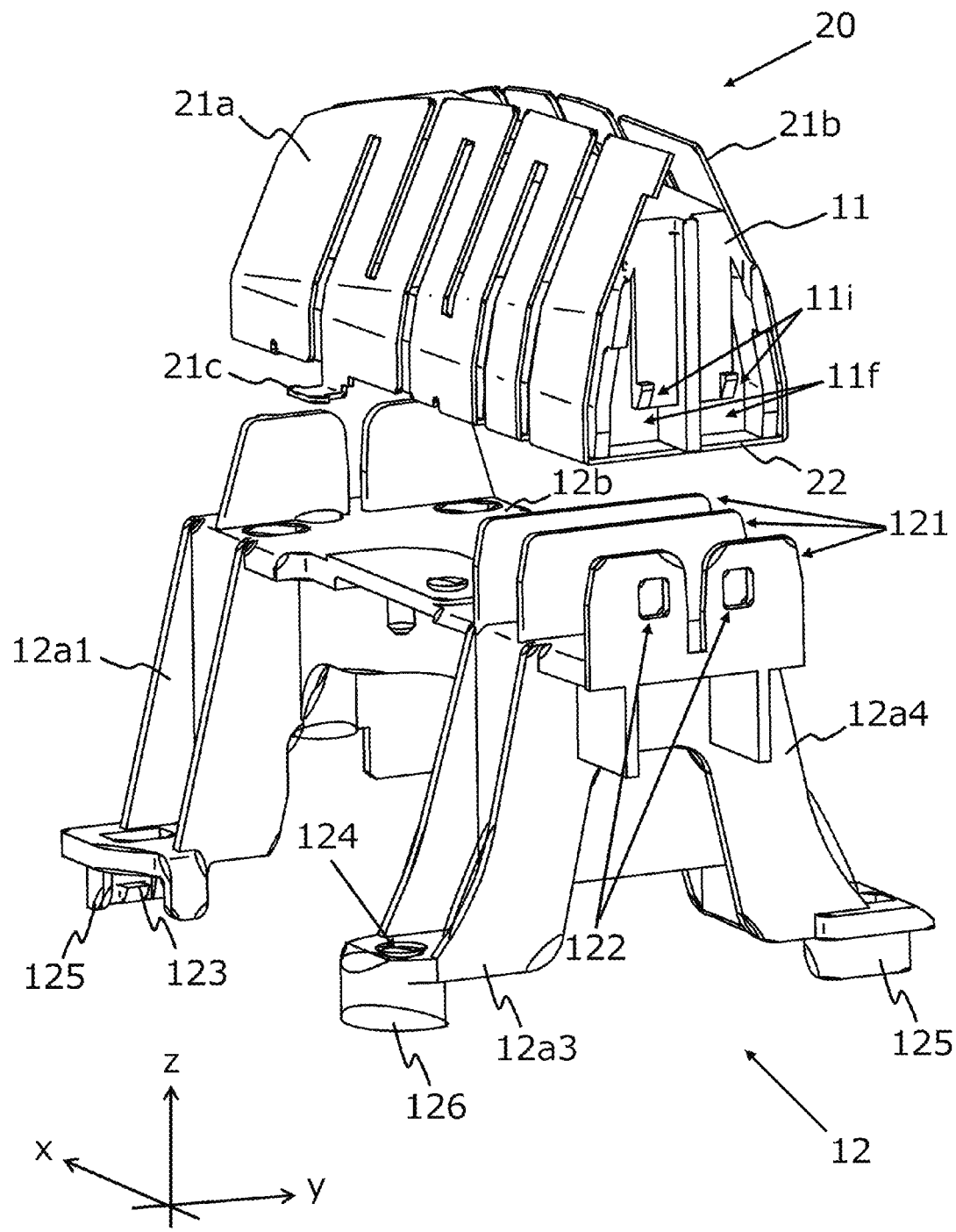
FIG. 15 is a perspective view of the capacitance loading element, the upper holder, and the lower holder, and illustrates a state before the upper holder having the capacitance loading element attached is attached to the lower holder, and also is the view illustrating only a portion located in front of the portion including a first fitting claw and an fitting hole.

Attachment of the lower holder 12 to the metal base 50 will be described. As illustrated in FIG. 15, among the four leg portions included in the lower holder 12, a second fitting claw 123 is provided in a lower end in each of the first leg portion 12a1 at left front when seen from the rear in the x direction and the fourth leg portion 12a4 at right rear when seen from the rear in the x direction.

Furthermore, among the four leg portions included in the lower holder 12, a screw hole 124 is provided at a lower end in each of the second leg portion 12a2 at right front when seen from the rear in the x direction, and the third leg portion 12a3 at left rear when seen from the rear in the x direction.

The respective first leg portion 12a1 and the fourth leg portion 12a4 are attached to the protrusions 51 of the metal base 50 by snap fastening.

The respective second leg portion 12a2 and the third leg portion 12a3 are attached to the protrusions 51 of the metal base 50 by screwing.

A first guide 125 covering a part of a periphery of the protrusion 51 is provided around the second fitting claw 123 at the lower end in each of the first leg portion 12a1 and the fourth leg portion 12a4.

A second guide 126 covering a part of a periphery of the protrusion 51 is provided around the screw hole 124 at the lower end in each of the second leg portion 12a2 and the third leg portion 12a3.

Position alignment of the first leg portion 12a1 to the fourth leg portion 12a4 can be easily performed with respect to the metal base 50 by fitting the first guides 125 and the second guides 126 into the protrusions 51.

The protrusions 51 protruding upward in the z direction are provided at the portions of the metal base 50 to which the four leg portions (the first leg portion 12a1 to the fourth leg portion 12a4) of the lower holder 12 are attached.

Figure 20:
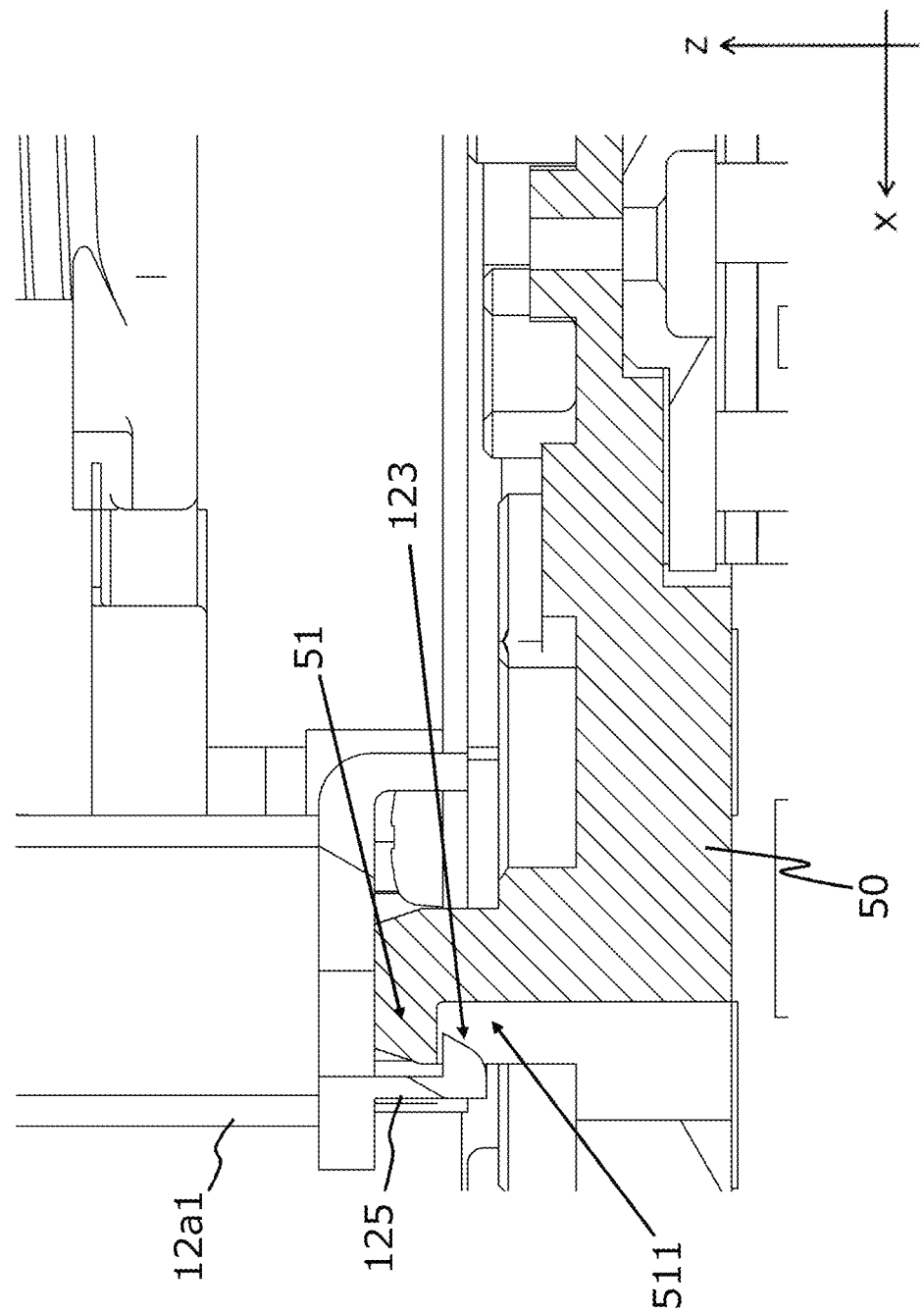
FIG. 20 is a cross-sectional configuration view of a portion where the lower holder and a metal base are fixed by snap fastening.
Figure 21:
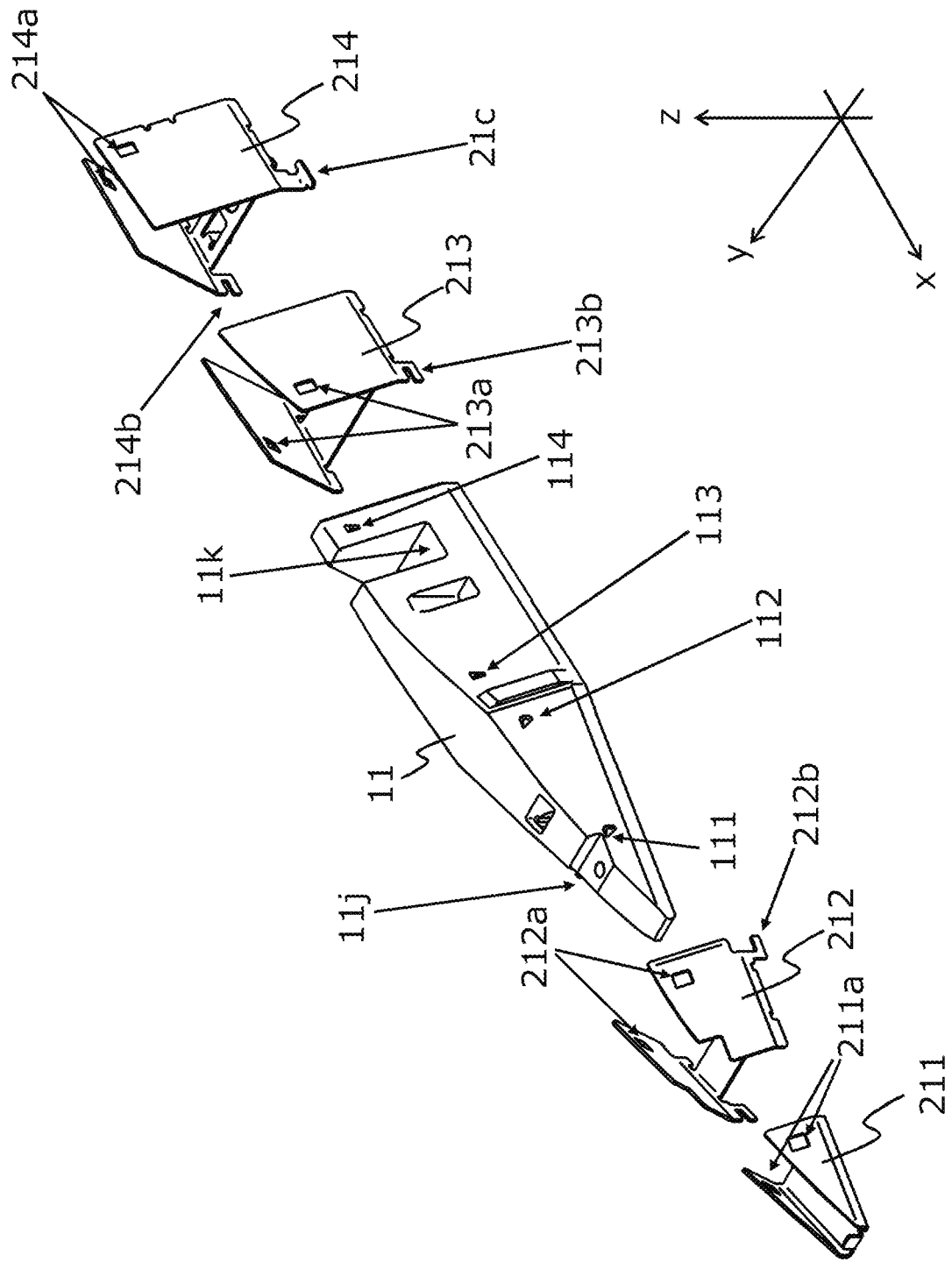
FIG. 21 is a perspective view of an antenna device for the vehicle of a third embodiment when seen from above, and illustrates a state before a capacitance loading element is attached to an upper holder, in which the capacitance loading element includes: two elements (a first member and a second member) inserted from the front; and two elements (a third member and a fourth member) inserted from the rear.
Figure 22:
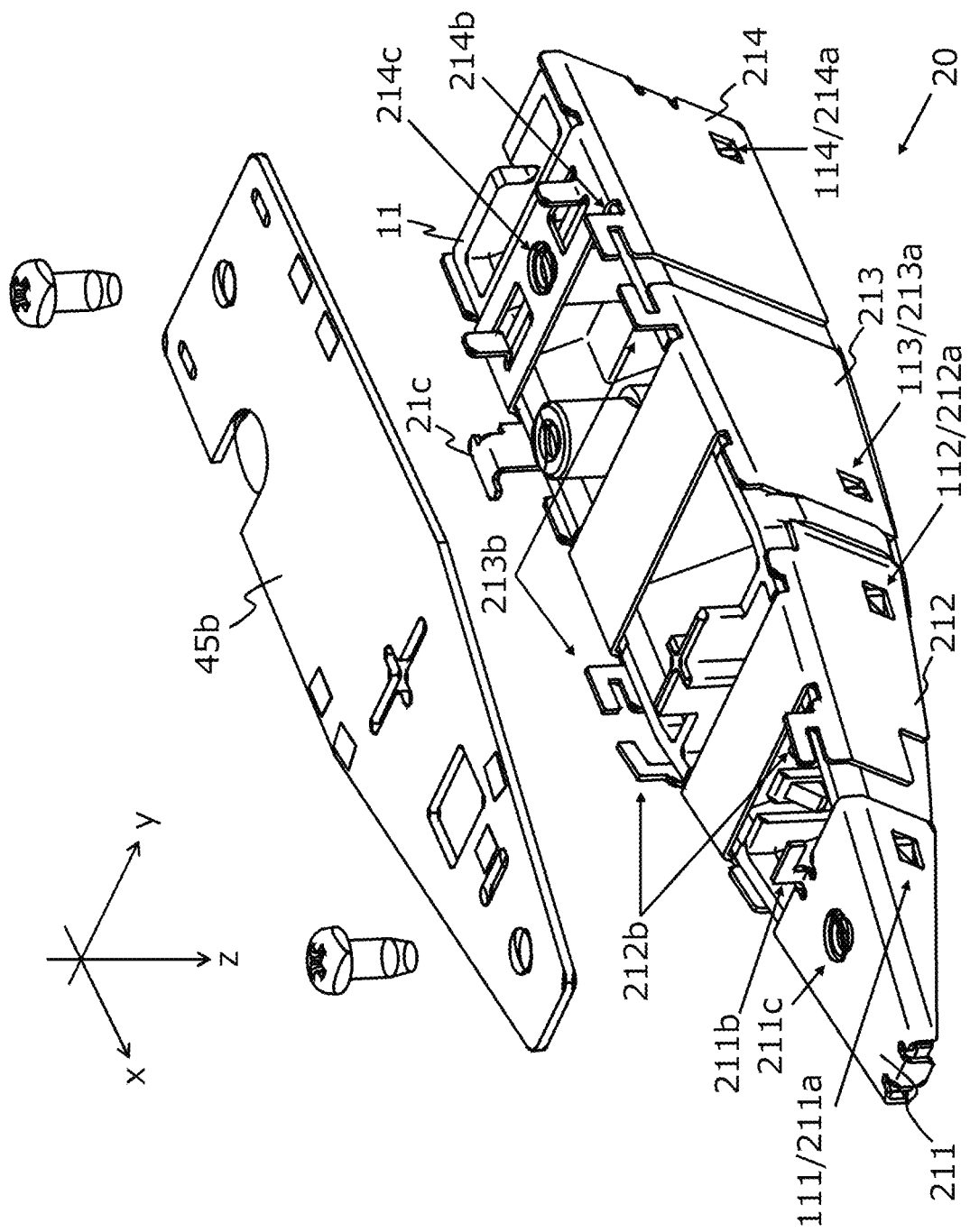
FIG. 22 is a perspective view from below and illustrates a state before a second board is attached to the upper holder having the capacitance loading element attached, in which the capacitance loading element includes: the two elements (the first member and the second member) inserted from the front; and the two elements (the third member and the fourth member) inserted from the rear.
Figure 23:
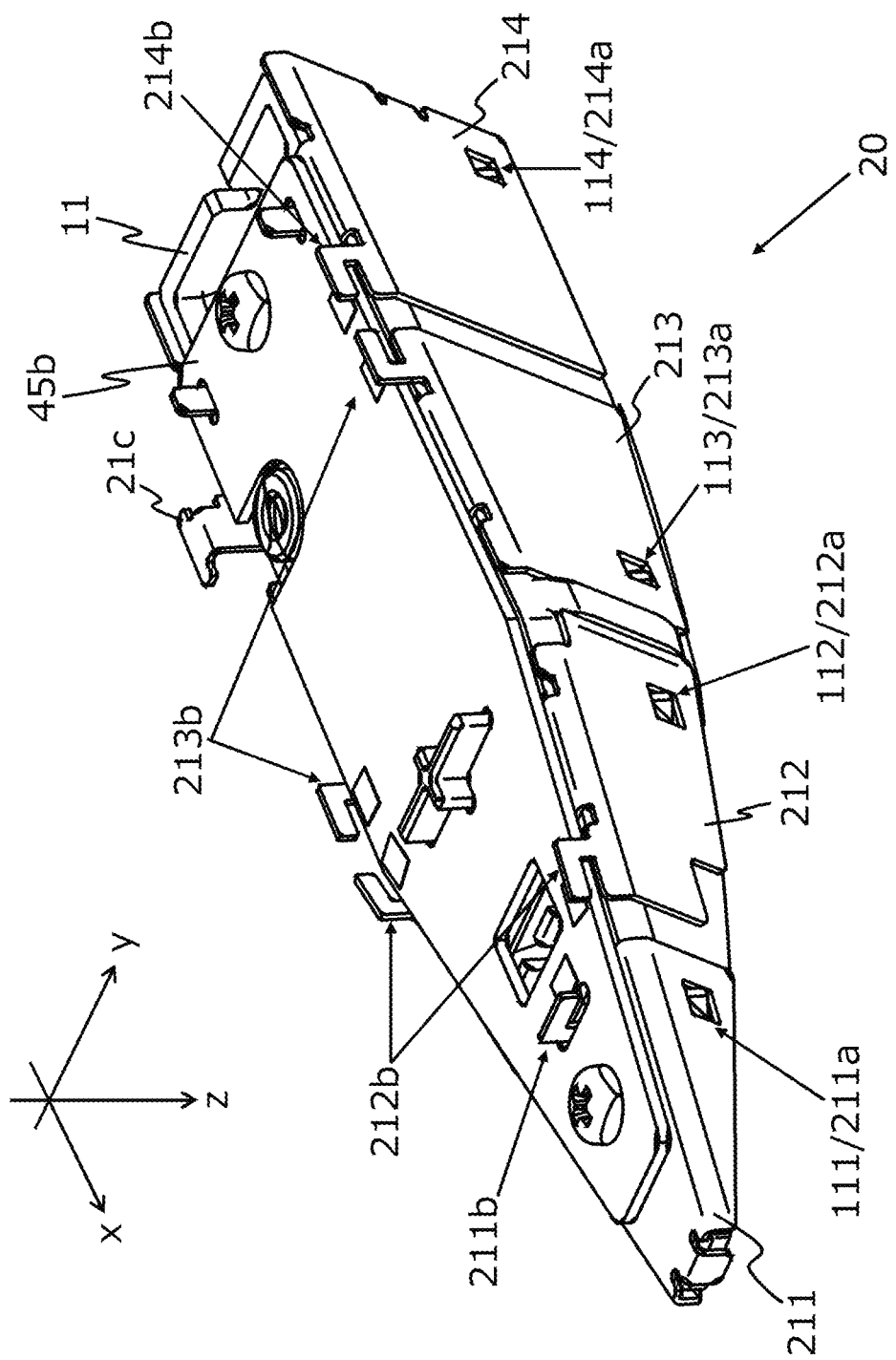
FIG. 23 is a perspective view from below and illustrates a state after the second board is attached to the upper holder having the capacitance loading element attached, in which the capacitance loading element includes: the two elements (the first member and the second member) inserted from the front; and the two elements (the third member and the fourth member) inserted from the rear.
Figure 24:
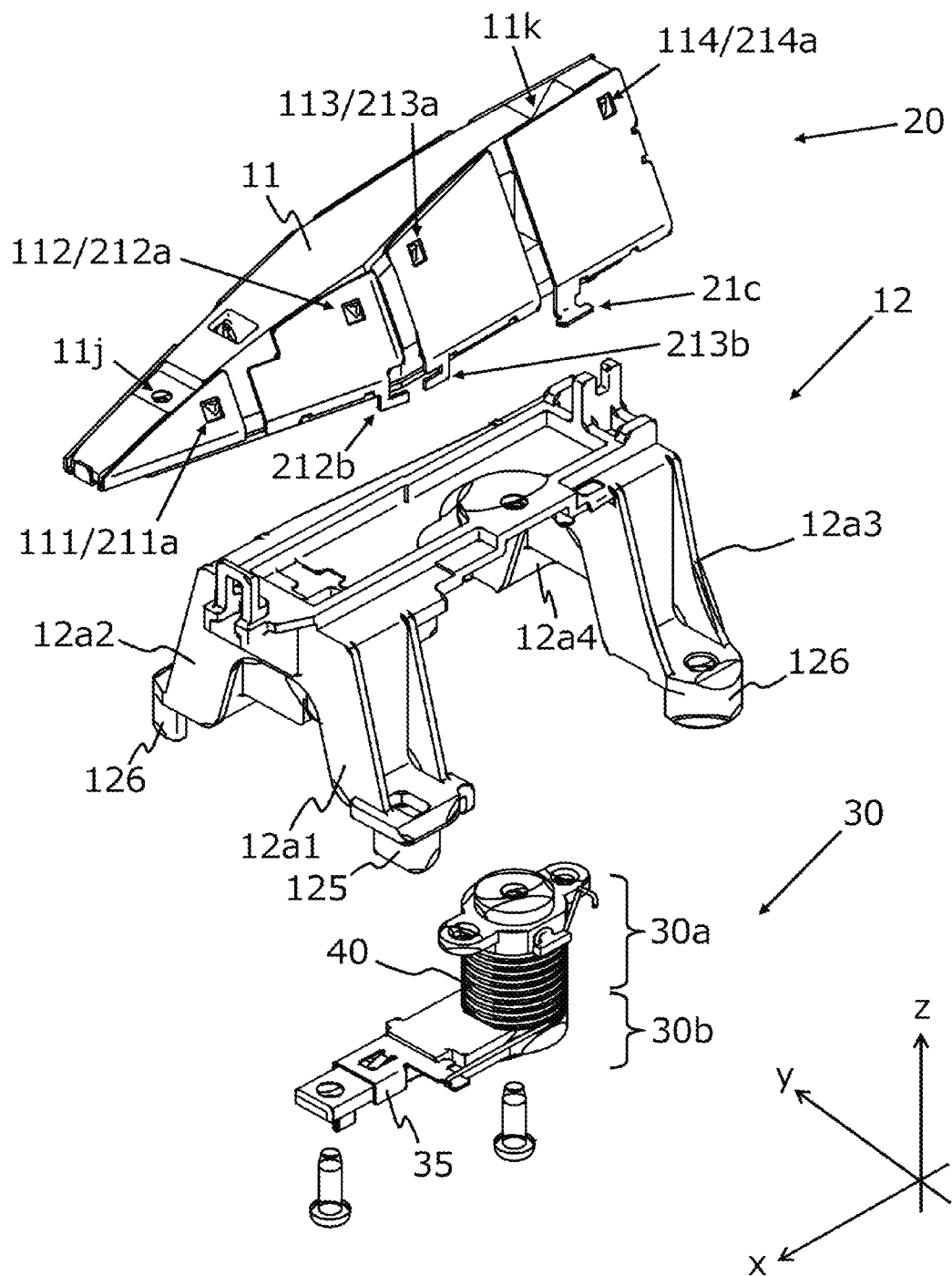
FIG. 24 is a perspective view illustrating a state before a helical element holder having a helical element attached and the upper holder having the capacitance loading element attached are attached to a lower holder, in which the capacitance loading element includes: the two elements (the first member and the second member) inserted from the front and the two elements (the third member and the fourth member) inserted from the rear.
Figure 25:
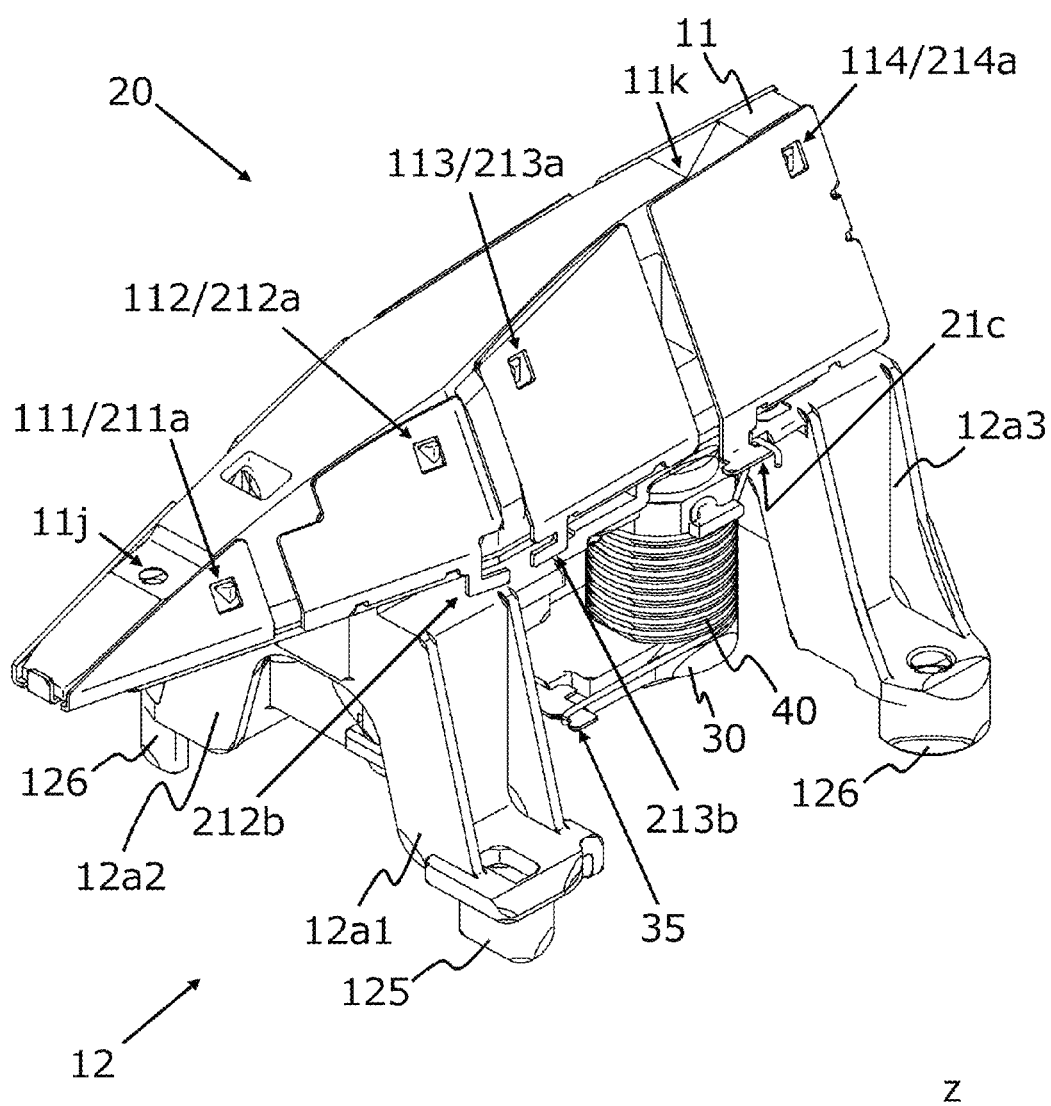
FIG. 25 is a perspective view illustrating a state after the helical element holder having the helical element attached and the upper holder having the capacitance loading element attached are attached to the lower holder, in which the capacitance loading element includes: the two elements (the first member and the second member) inserted from the front; and the two elements (the third member and the fourth member) inserted from the rear.

Among the protrusions 51, those corresponding to the first leg portion 12a1 and the fourth leg portion 12a4 are provided with fitting portions 511 into which the second fitting claws 123 are fitted (see FIG. 20).

Among the protrusions 51, those corresponding to the second leg portion 12a2 and the third leg portion 12a3 are provided with the screw holes.

The respective first leg portion 12a1 and the fourth leg portion 12a4 are attached to the protrusions 51 of the metal base 50 by the snap fastening. The respective second leg portion 12a2 and the third leg portion 12a3 are attached to the protrusions 51 of the metal base 50 by the screwing.

That is, the lower holder 12 and the metal base 50 are fixed by the screwing at the two places and the snap fastening at the two places.

Compared to a configuration in which all of the four places employ fixation by the screwing, the number of screws can be further reduced.

Additionally, the lower holder 12 can be temporarily fixed to the metal base 50 together with the position alignment by the snap fastening, prior to the screwing. Therefore, position alignment is not required at the time of screwing, and the screwing can be accurately performed.

Additionally, compared to a configuration in which all of the four places employ the snap fastening, the lower holder 12 and the metal base 50 can be more reliably fixed.

Figure 19:
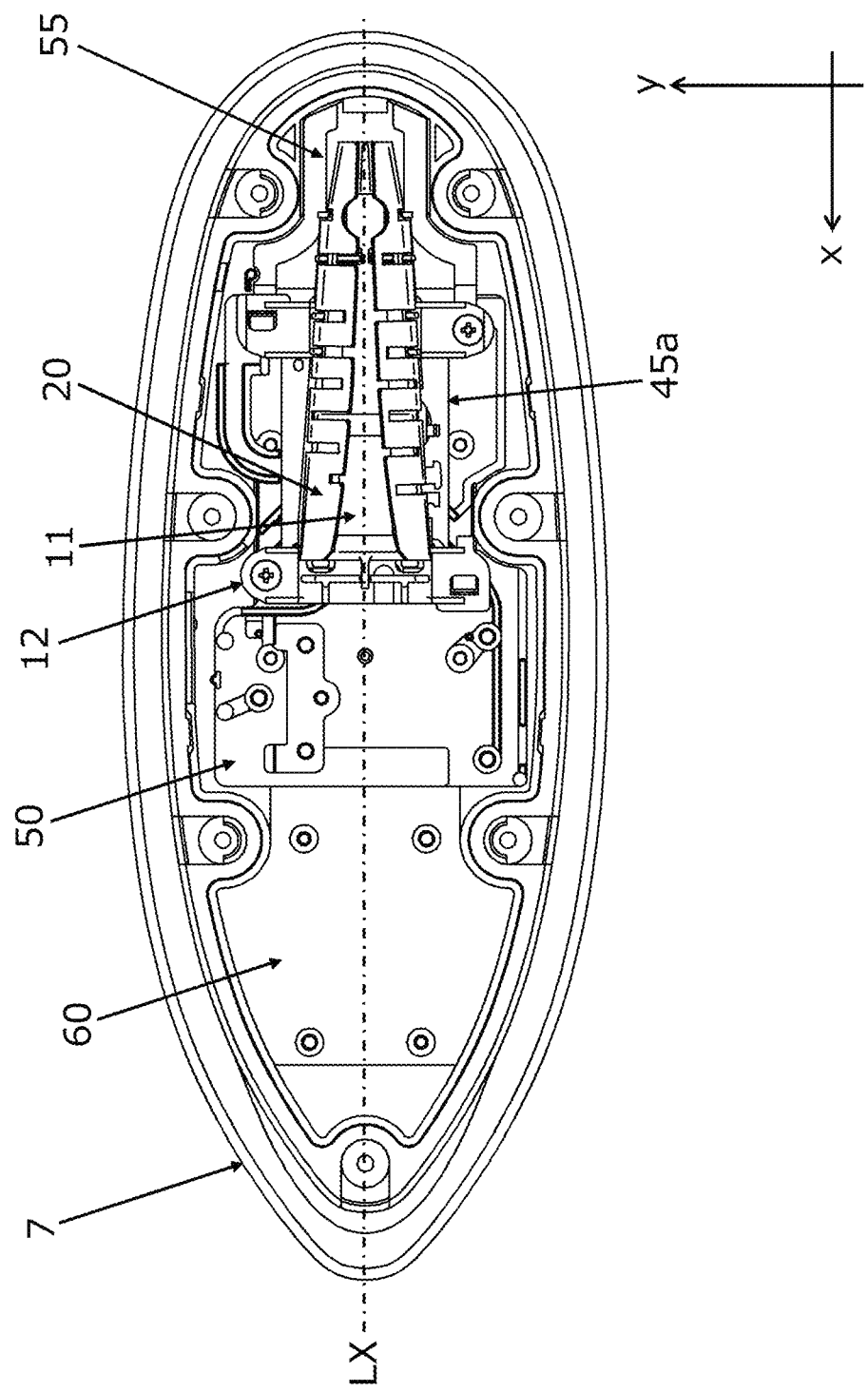
FIG. 19 is a top view of the antenna device for the vehicle in the state before the antenna case is attached.

Furthermore, as illustrated in FIG. 19, the rear metal base 55 is attached to the rear in the x direction of the metal base 50. The rear metal base 55 is a plate material made of sheet metal, and adjusts a resonance frequency of unnecessary resonance.

Modification of First Embodiment

Note that the resin base 60 may hold the lower holder 12 and the first board 45a without providing the metal base 50.

Alternatively, the metal base 50 and the antenna case 5 may sandwich the pad 7 without providing the resin base 60.

To keep symmetry of the capacitance loading element 20 in the y direction, it is preferable to determine the shapes and the positional relation of the first element 21a and the second element 21b such that the outer shapes thereof become substantially symmetrical interposing the xz plane including the center line LX when seen from the x direction (see FIG. 19). The center line LX herein is the center line in the y direction of the connecting portion 22 that connects the first element 21a and the second element 21b and is located at the lower portion.

Note that, in the above-described embodiment, it has been described that the upper holder 11 and the lower holder 12 sandwich all of the eleventh metal plate 22a to the fifteenth metal plate 22e constituting the connecting portion 22. However, the embodiment is not limited thereto. For example, it is conceivable that the upper holder 11 and the lower holder 12 sandwich at least one of the eleventh metal plate 22a to the fifteenth metal plate 22e constituting the connecting portion 22.

Second Embodiment

In the first embodiment, an upper holder 11 and a capacitance loading element 20 have shapes each of which having a width in a y direction is gradually narrowed toward rear in an x direction from front in the x direction. Additionally, the width in the y direction of the capacitance loading element 20 at the front in the x direction is wider than the width in the y direction of the upper holder 11 at the rear in the x direction. However, shapes of the upper holder 11 and the capacitance loading element 20 are not limited thereto.

For example, a second embodiment as described below is conceivable. In the second embodiment, the upper holder 11 and the capacitance loading element 20 have shapes each of which having the width in the y direction is gradually narrowed toward the front in the x direction from the rear in the x direction. Additionally, the width in the y direction at the rear in the x direction of the capacitance loading element 20 is wider than the width in the y direction at the front in the x direction of the upper holder 11.

In this case, the capacitance loading element 20 can be easily attached to the upper holder 11 by inserting the rear in the x direction of the capacitance loading element 20 from the front in the x direction of the upper holder 11.

Third Embodiment

Additionally, a third embodiment as described below is conceivable (see FIG. 21 to FIG. 25). In the third embodiment, the capacitance loading element 20 has a structure divided into a front portion located at front in an x direction and a rear portion located at rear in the x direction, and the two portions are electrically coupled via an electronic component or an electric circuit. The upper holder 11 has a shape in which a width in a y direction is gradually narrowed toward the front in the x direction from a center portion in the x direction, and the width in the y direction is gradually narrowed toward the rear in the x direction from the center portion in the x direction. The front portion of the capacitance loading element 20 has a shape in which a width in the y direction is gradually narrowed toward the front in the x direction from the rear in the x direction. The rear portion of the capacitance loading element 20 has a shape in which the width in the y direction is gradually narrowed toward the rear in the x direction from the front in the x direction. The width in the y direction of the front portion of the capacitance loading element 20 at the rear in the x direction is wider than the width in the y direction of the upper holder 11 at the front in the x direction. The width in the y direction of the rear portion of the capacitance loading element 20 at the front in the x direction is wider than the width in the y direction of the upper holder 11 at the rear in the x direction.

In this case, the capacitance loading element 20 can be easily attached to the upper holder 11 by inserting the front portion of the capacitance loading element 20 from the front in the x direction of the upper holder 11, and inserting the rear portion of the capacitance loading element 20 from the rear in the x direction of the upper holder 11.

FIG. 21 to FIG. 25 illustrate an example in which the capacitance loading element 20 includes a first member 211 and a second member 212 as the front portion, and a third member 213 and a fourth member 214 as the rear portion. Said front portion is a portion having a shape in which the width in the y direction is gradually narrowed toward the front in the x direction from the rear in the x direction of the capacitance loading element 20. Said rear portion is a portion having a shape in which the width in the y direction is gradually narrowed toward the rear in the x direction from the front in the x direction of the capacitance loading element 20.

Protrusions protruding in the y direction are provided in each of side portions (the first side portion 11a and the second side portion 11b) of the upper holder 11. Said protrusions include a first protrusion 111 to a fourth protrusion 114. The first protrusion 111 to the fourth protrusion 114 are sequentially arranged from the front in the x direction.

The first protrusion 111 and the second protrusion 112 are provided at the front portion (the portion having the shape in which the width in the y direction is gradually narrowed toward the front in the x direction from the center portion in the x direction) of the upper holder 11.

The third protrusion 113 and the fourth protrusion 114 are provided at the rear portion (the portion having a shape in which the width in the y direction is gradually narrowed toward the rear in the x direction from the center portion in the x direction) of the upper holder 11.

Each of the first member 211 to the fourth member 214 includes a right element, a left element, and a connecting member that connects these elements, when seen from the rear in the x direction.

The left elements of the first member 211 to the fourth member 214 function as the first element 21a. The right elements of the first member 211 to the fourth member 214 function as the second element 21b. The connecting members of the first member 211 to the fourth member 214 function as the connecting portion 22.

First attachment holes 211a are provided in each of the right element and the left element of the first member 211.

A first protruding portion 211b is provided at a lower portion of the connecting member of the first member 211. The first protruding portion 211b has a substantially L shape when seen from the x direction and protrudes downward in a z direction.

The second member 212 is arranged further rearward in the x direction than the first member 211.

Second attachment holes 212a are provided in each of the right element and the left element of the second member 212.

Second protruding portions 212b are provided in each of lower portions of the right element and the left element of the second member 212. Each second protruding portion 212b has a substantially L shape when seen from the y direction, and protrudes downward in the z direction.

The third member 213 is arranged further rearward in the x direction than the second member 212.

Third attachment holes 213a are provided in each of the right element and the left element of the third member 213.

Third protruding portions 213b are provided in each of the lower portions of the right element and the left element of the third member 213. Each third protruding portion 213b has a substantially L shape when seen from the y direction, and protrudes downward in the z direction.

The fourth member 214 is arranged further rearward in the x direction than the third member 213.

Fourth attachment holes 214a are provided in each of the right element and the left element of the fourth member 214.

A fourth protruding portion 214b is provided at a lower portion of the right element of the fourth member 214. The fourth protruding portion 214b has a substantially L shape when seen from the y direction, and protrudes downward in the z direction.

The connection point 21c is provided at a lower portion of the left element of the fourth member 214.

The second member 212 is inserted from the front in the x direction of the upper holder 11 such that the second protrusions 112 are fitted into the second attachment holes 212a. As a result, the second member 212 is attached to the upper holder 11.

Next, the first member 211 is inserted from the front in the x direction of the upper holder 11 such that the first protrusions 111 are fitted into the first attachment holes 211a. As a result, the first member 211 is attached to the upper holder 11.

Additionally, the third member 213 is inserted from the rear in the x direction of the upper holder 11 such that the third protrusions 113 are fitted into the third attachment holes 213a. As a result, the third member 213 is attached to the upper holder 11.

Next, the fourth member 214 is inserted from the rear in the x direction of the upper holder 11 such that the fourth protrusions 114 are fitted into the fourth attachment holes 214a. As a result, the fourth member 214 is attached to the upper holder 11.

The electrical connection between the first member 211 to the fourth member 214 is made via the first protruding portion 211b to the fourth protruding portion 214b, and a second board 45b including an electronic component and an electric circuit.

The second board 45b is arranged in a positional relation of being sandwiched in the z direction between the first member 211 to the fourth member 214 and the lower holder 12.

The second board 45b is attached to the upper holder 11 by screwing via a screw hole 211c provided at the connecting member of the first member 211, and a screw hole 214c provided at the connecting member of the fourth member 214.

A region of the upper holder 11, which faces the screw hole 211c of the first member 211, is provided with a receiving surface for the screwing. The region facing the screw hole 211c of the first member 211 is a lower portion of a recessed region 11j at the front in the x direction of the upper holder 11.

A region of the upper holder 11, which faces the screw hole 214c of the fourth member 214, is provided with a receiving surface for the screwing. The region facing the screw hole 214c of the fourth member 214 is a lower portion of a recessed region 11k at the rear in the x direction of the upper holder 11.

The first protruding portion 211b to the fourth protruding portion 214b are attached to the second board 45b by bending tips thereof or soldering.

The second board 45b is attached to the upper holder 11 while sandwiching, in the z direction, the connecting portion 22 (the respective connecting members of the first member 211 to the fourth member 214) of the capacitance loading element 20.

The upper holder 11 is attached to the lower holder 12 while the capacitance loading element 20 (the first member 211 to the fourth member 214) and the second board 45b are attached.

Some embodiments of the present invention have been described above, but these embodiments are provided as the examples and are not intended to limit the scope of the invention. These embodiments can be implemented by other various configurations, and it is possible to make various kinds of omissions, replacements, and changes within the range not departing from the gist of the invention. These embodiments and modifications thereof are included in the scope and the gist of the invention, and are similarly included in the invention described in the claims and the scope equivalent thereto.

REFERENCE SIGNS LIST

1 Antenna device for vehicle
5 Antenna case
7 Pad
10 Capacitance loading element holder
11 Upper holder
11a First side portion
11b Second side portion
11c Front surface portion
11d Rear surface portion
11e Upper surface portion
11f Reinforcing rib
11g Stopper 11h Slit
11i First fitting claw
11j Recessed region at front
11k Recessed region at rear
111 to 114 First protrusion to fourth protrusion
12 Lower holder
12a1 to 12a4 First leg portion to fourth leg portion
12b Top plate
121 Rib
122 Fitting hole
123 Second fitting claw
124 Screw hole
125 First guide
126 Second guide
20 Capacitance loading element
21a First element
21a1, 21a2 First metal plate and a second metal plate constituting first element
21b Second element
21b1 to 21b3 Third metal plate to fifth metal plate constituting second element
21c Connection point
211 to 214 First member to fourth member
211a to 214a First attachment hole to fourth attachment hole
211b to 214b First protruding portion to fourth protruding portion
211c, 214c Screw hole Connecting portion
22a to 22e Eleventh metal plate to fifteenth metal plate constituting connecting portion
30 Helical element holder
30a First region
30b Second region
35 Connection metal fitting
40 Helical element
45a First board
45b Second board
50 Metal base
55 Rear metal base
51 Protrusion
511 Engagement portion
60 Resin base
LX Center line in y direction of connecting portion at lower portion
θ1, θ2 First angle, second angle

The invention claimed is:

1. An antenna device for a vehicle comprising:
an antenna case;
a capacitance loading element housed in an internal space of the antenna case;
a helical element housed in the internal space of the antenna case and electrically connected to the capacitance loading element;
a capacitance loading element holder including an upper holder and a lower holder, and configured to sandwich and hold the capacitance loading element between the upper holder and the lower holder; and
a base configured to hold the lower holder,
wherein in a state before the capacitance loading element is attached to the capacitance loading element holder, a first angle formed by a region from a lower edge to an upper edge in the capacitance loading element with respect to the base is smaller than a second angle formed by a region from a lower edge to an upper edge of a region included in the upper holder that holds the capacitance loading element, with respect to the base.

2. The antenna device for the vehicle according to claim 1, wherein
the capacitance loading element includes two elements and a connecting portion that connects the two elements,
the connecting portion is provided at a position lower than upper edges of the two elements,
the upper holder holds the two elements, and
the upper holder and the lower holder sandwich and hold the connecting portion.

3. The antenna device for the vehicle according to claim 2, wherein the upper holder fills a space surrounded by the two elements and the connecting portion.

4. The antenna device for the vehicle according to claim 2, wherein the first angle is an angle formed by a region from a lower edge to an upper edge in each of the two elements with respect to the base, and the second angle is an angle formed by a region from a lower edge to an upper edge of a region included in each of side surfaces of the upper holder that holds the two elements, with respect to the base.

5. The antenna device for the vehicle according to claim 1, wherein the upper holder and the capacitance loading element each have a shape in which a width in a right-left direction is gradually narrowed toward the rear from the front, and wherein a width in the right-left direction of the capacitance loading element at the front is wider than a width in the right-left direction of the upper holder at the rear.

6. The antenna device for the vehicle according to claim 1, wherein the upper holder and the capacitance loading element each have a shape in which a width in a right-left direction is gradually narrowed toward the front from the rear, and
wherein a width in the right-left direction of the capacitance loading element at the rear is wider than the width in the right-left direction of the upper holder at the front.

7. The antenna device for the vehicle according to claim 1, wherein
the capacitance loading element has a structure divided into a front portion and a rear portion,
the upper holder has a shape in which a width in a right-left direction is gradually narrowed toward the front from a center portion and a width in the right-left direction is gradually narrowed toward the rear from the center portion,
the front portion of the capacitance loading element has a shape in which a width in the right-left direction is gradually narrowed toward the front from a center portion,
the rear portion of the capacitance loading element has a shape in which a width in the right-left direction is gradually narrowed toward the rear from the center portion,
the width in the right-left direction of the front portion of the capacitance loading element at the rear is wider than the width in the right-left direction of the upper holder at the front, and
the width in the right-left direction of the rear portion of the capacitance loading element at the front is wider than the width in the right-left direction of the upper holder at the rear.

8. The antenna device for the vehicle according to claim 1, wherein
the capacitance loading element is at least partly formed in a meander shape,
the upper holder includes a slit overlapping with the meander shape, and the lower holder includes, at a position facing the slit, a rib that can be housed in the slit.

9. An antenna device for a vehicle comprising:
an antenna case;
a capacitance loading element housed in an internal space of the antenna case;
a helical element housed in the internal space of the antenna case and electrically connected to the capacitance loading element;
a capacitance loading element holder including an upper holder and a lower holder, and configured to sandwich and hold the capacitance loading element between the upper holder and the lower holder; and
a base configured to hold the lower holder,
wherein a width in a right-left direction of the upper holder at the front is different from a width in the right-left direction of the upper holder at the rear.

10. The antenna device for the vehicle according to claim 9, wherein the capacitance loading element includes two elements and a connecting portion that connects the two elements,
wherein the connecting portion is provided at a position lower than upper edges of the two elements,
wherein the upper holder holds the two elements, and
wherein the upper holder and the lower holder sandwich and hold the connecting portion.

11. The antenna device for the vehicle according to claim 10, wherein the upper holder fills a space surrounded by the two elements and the connecting portion.

12. The antenna device for the vehicle according to claim 10, wherein in a state before the capacitance loading element is attached to the capacitance loading element holder, a first angle formed by a region from a lower edge to an upper edge in each of the two elements with respect to the base is smaller than a second angle formed by a region from a lower edge to an upper edge of a region included in each of side surfaces of the upper holder that holds the two elements, with respect to the base.

13. The antenna device for the vehicle according to claim 9, wherein the upper holder and the capacitance loading element each have a shape in which a width in the right-left direction is gradually narrowed toward the rear from the front, and
wherein a width in the right-left direction of the capacitance loading element at the front is wider than a width in the right-left direction of the upper holder at the rear.

14. The antenna device for the vehicle according to claim 9, wherein the upper holder and the capacitance loading element each have a shape in which a width in the right-left direction is gradually narrowed toward the front from the rear, and
wherein a width in the right-left direction of the capacitance loading element at the rear is wider than the width in the right-left direction of the upper holder at the front.

15. The antenna device for the vehicle according to claim 9, wherein the capacitance loading element has a structure divided into a front portion and a rear portion,
wherein the upper holder has a shape in which a width in the right-left direction is gradually narrowed toward the front from a center portion and a width in the right-left direction is gradually narrowed toward the rear from the center portion,
wherein the front portion of the capacitance loading element has a shape in which a width in the right-left direction is gradually narrowed toward the front from a center portion,
wherein the rear portion of the capacitance loading element has a shape in which a width in the right-left direction is gradually narrowed toward the rear from the center portion,
wherein the width in the right-left direction of the front portion of the capacitance loading element at the rear is wider than the width in the right-left direction of the upper holder at the front, and
wherein the width in the right-left direction of the rear portion of the capacitance loading element at the front is wider than the width in the right-left direction of the upper holder at the rear.

16. The antenna device for the vehicle according to claim 9, wherein the capacitance loading element is at least partly formed in a meander shape,
wherein the upper holder includes a slit overlapping with the meander shape, and
wherein the lower holder includes, at a position facing the slit, a rib that can be housed in the slit.

17. The antenna device for the vehicle according to claim 9, wherein in a state before the capacitance loading element is attached to the capacitance loading element holder, a first angle formed by a region from a lower edge to an upper edge in the capacitance loading element with respect to the base is smaller than a second angle formed by a region from a lower edge to an upper edge of a region included in the upper holder that holds the capacitance loading element, with respect to the base.

* * * * *